United States Patent
Nomura et al.

(10) Patent No.: US 10,990,224 B2
(45) Date of Patent: Apr. 27, 2021

(54) TOUCH DETECTION METHOD, TOUCH DETECTION APPARATUS, AND TOUCH SENSOR CONTROLLER

(71) Applicant: Wacom Co., Ltd., Saitama (JP)

(72) Inventors: Yoshio Nomura, Saitama (JP); Kazuhiro Miyoshi, Tokyo (JP); Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 12 days.

(21) Appl. No.: 15/901,559

(22) Filed: Feb. 21, 2018

(65) Prior Publication Data

US 2018/0181255 A1  Jun. 28, 2018

Related U.S. Application Data

(63) Continuation of application No. PCT/JP2015/076095, filed on Sep. 15, 2015.

(51) Int. Cl.
    *G06F 3/045* (2006.01)
    *G06F 3/041* (2006.01)
    *G06F 3/044* (2006.01)

(52) U.S. Cl.
    CPC ........ *G06F 3/04186* (2019.05); *G06F 3/0446* (2019.05); *G06F 2203/04111* (2013.01)

(58) Field of Classification Search
    CPC ...... G06F 3/0416; G06F 3/0418; G06F 3/044; G06F 2203/04111
    USPC ........................................................ 345/174
    See application file for complete search history.

(56) References Cited

U.S. PATENT DOCUMENTS

| 9,158,403 B2 | 10/2015 | Kasamatsu |
| 9,229,573 B2 | 1/2016 | Igarashi et al. |
| 2009/0256825 A1* | 10/2009 | Klinghult .............. G06F 3/0445 345/179 |
| 2011/0074731 A1 | 3/2011 | Inoue et al. |
| 2013/0154965 A1* | 6/2013 | Hwang ................. G06F 3/0416 345/173 |
| 2014/0092033 A1* | 4/2014 | Chang ..................... G06F 3/044 345/173 |
| 2014/0184551 A1* | 7/2014 | Igarashi ................. G06F 3/041 345/173 |

FOREIGN PATENT DOCUMENTS

| JP | 2011-76484 A | 4/2011 |
| JP | 2011-210038 A | 10/2011 |
| JP | 2012-150747 A | 8/2012 |

(Continued)

*Primary Examiner* — Jonathan M Blancha
(74) *Attorney, Agent, or Firm* — Seed IP Law Group LLP

(57) ABSTRACT

A touch detection method is performed by a controller of a touch sensor of a capacitive type including sensor electrodes. The touch detection method includes acquiring detection values at crossing positions of the sensor electrodes, each detection value corresponding to a capacitance between an indicator and the touch sensor at one of the crossing positions, acquiring a maximum value among the detection values at the crossing positions, determining a first threshold value by subtracting a subtraction value, which is a fixed value or a value that decreases as the maximum value increases, from the maximum value, and deriving a position of the indicator based on the detection values at the crossing positions with reference to the first threshold value.

7 Claims, 23 Drawing Sheets

(56) References Cited

FOREIGN PATENT DOCUMENTS

| | | | |
|---|---|---|---|
| JP | 2013-88982 | A | 5/2013 |
| JP | 2013-254331 | A | 12/2013 |
| JP | 2014-56460 | A | 3/2014 |
| JP | 2014-56512 | A | 3/2014 |
| JP | 2014-203205 | A | 10/2014 |

* cited by examiner

TOUCH DETECTION METHOD, TOUCH DETECTION APPARATUS, AND TOUCH SENSOR CONTROLLER

BACKGROUND

Technical Field

The present disclosure relates to a touch detection method, a touch detection apparatus, and a touch sensor controller, and particularly to a touch detection method, a touch detection apparatus, and a touch sensor controller by which a variation in capacitance between sensor electrodes caused by an approach of an object is detected.

Description of the Related Art

A touch sensor of a capacitive type is configured such that a plurality of X electrodes individually extending in a Y direction and a plurality of Y electrodes individually extending in an X direction are arranged in a crossing relationship with each other. In the touch sensor, for example, a process of inputting a predetermined signal to a Y electrode and extracting a signal in order from the X electrodes is repeated in order for all Y electrodes. If an indicator such as a finger comes close to a touch face of the touch sensor, then a capacitance is generated between an X electrode and a Y electrode located in the proximity of the pointer, and part of a current having flowed to the X electrode is drawn off in a direction toward the indicator through the capacitance. Consequently, the amplitude of a signal taken out from the X electrode decreases. Then, the touch sensor of the capacitive type detects an increase of the capacitance from a variation of the amplitude and derives coordinates indicative of the center of gravity of a region, in which the capacitance is equal to or higher than a threshold value, as position coordinates of the indicator.

Meanwhile, although a touch detection apparatus represented by a tablet terminal is generally configured such that a touch sensor of the capacitive type is arranged on a display face of a liquid crystal display apparatus, as a particular method of the arrangement, an example is known in which a space (air gap) is provided between the display face of the liquid crystal display apparatus and the touch sensor. In this case, fixation between the touch sensor and the liquid crystal display apparatus is implemented by a spacer or the like disposed along an edge of the display face. The type of such a touch detection apparatus that has an air gap as just described is hereinafter referred to as "air gap type."

Although a touch detection apparatus of the air gap type is advantageous in that appearance of moiré can be avoided, that a step of providing a bonding agent layer on a liquid crystal display apparatus can be omitted, that a failed touch sensor can be replaced easily and so forth, it has a weak point that, in such a case that the touch face is pushed strongly by an indicator such as a finger or in a like case, some "deflection" occurs with the touch sensor. If some "deflection" occurs and the touch sensor comes closer to the display face of the liquid crystal display apparatus, then the capacitance described above increases in the region, and this gives rise to an equivalent effect that the indicator is detected over a very wide region. Since the center of gravity of the wide region detected in this manner does not necessarily coincide with the indication position by the indicator, the accuracy in position detection is degraded by occurrence of deflection.

Japanese Patent Laid-Open No. 2011-076484 (hereinafter referred to as Patent Document 1) discloses that, in a touch detection apparatus of the air gap type configured such that, when the number of electrodes from which a capacitance higher than a touch threshold value is equal to or greater than a predetermined number, the touch detection apparatus decides that "deflection" occurs and cancels, in this case, calculation of a contact position, if the successive touch down count that is the number of times by which a contact position between the touch panel and an object is outputted successively is greater than a predetermined threshold value, then the deflection decision process is cancelled. When the cause of the "deflection" is strong depression of the touch face by an indicator, if this is detected as "deflection," then also position detection of the indicator cannot be performed. However, with the technology disclosed in Patent Document 1 also in such a case as just described, position detection of the indicator can be performed. However, the technology of Patent Document 1 is nothing but a technology that makes it possible to detect the position of the indicator even if "deflection" exists, and the method itself of deriving position coordinates of the indicator is similar to the conventional method described above. Therefore, the derivation accuracy of position coordinates when "deflection" occurs is not very high similarly as in the conventional technology.

Further, although there is no relation to "deflection," Japanese Patent Laid-Open No. 2013-088982 (hereinafter referred to as Patent Document 2) discloses a technology by which a threshold value for the capacitance provided in order to detect an indicator is changed dynamically in response to a type of the indicator. In this technology, the threshold value is calculated by multiplying an average value of detection values of the capacitance obtained in predetermined number of immediately preceding frames by a predetermined coefficient (for example, ½). According to this, a plurality of different indicators having capacitance detection values different from each other can be detected suitably.

Japanese Patent Laid-Open No. 2014-056512 (hereinafter referred to as Patent Document 3) discloses a touch detection apparatus that performs detection of an indicator on the basis of a difference value (DIFF value) between a detection value (RAW value) of the capacitance and a baseline value. This touch detection apparatus has a function for avoiding detection of a large object such as a palm by setting, when the difference value exceeds a threshold value in a region of an area greater than a certain area, a "large object flag" and then avoiding, when the "large object flag" is set, the coordinate calculation process, and a function for performing, when the state in which the "large object flag" is set continues for a predetermined period of time or more, a process (calibration) for setting a RAW value to a baseline value to avoid reflection of a later variation of the capacitance by approach of a large object such as a palm on the variation of the capacitance.

BRIEF SUMMARY

The subject of a touch detection apparatus of the air gap type that, when "deflection" occurs, the accuracy in position detection degrades is described more particularly.

FIG. 26A is a schematic view depicting a variation of the capacitance $C(i,j)$ by coordinates $(i,j)$ when no "deflection" occurs in a touch detection apparatus of the air gap type. Meanwhile, FIG. 26B is a schematic view depicting a variation of the capacitance $C(i,j)$ by coordinates $(i,j)$ when "deflection" occurs. In both figures, a small projected portion appearing in the proximity of the center represents a projected portion by an indicator.

As can be recognized from comparison between FIGS. 26A and 26B, a peak value P2 of the capacitance C when "deflection" occurs has a considerably high value in comparison with a peak value P1 of the capacitance C when no "deflection" occurs. This is because, when "deflection" occurs, the projected portion arising from the indicator appears at a projected portion of a great width caused by the "deflection."

In order to appropriately detect the position of an indicator when no "deflection" occurs, it is necessary to set a threshold value T for the capacitance C to a value lower than the peak value P1 as exemplified in FIG. 26A. Since, by such setting, a region S1 detected by the touch sensor coincides well with the position of the projected portion arising from the indicator as depicted in FIG. 26A, position detection of the indicator can be performed appropriately by deriving the center of gravity of the region S1 as the position of the indicator.

On the other hand, if the threshold value T determined in this manner (threshold value T of a value lower than the peak value P1) is used, then when "deflection" occurs as depicted in FIG. 26B, the accuracy in position detection degrades. In particular, as recognized from FIG. 26B, a region S2 detected by the touch sensor in this case coincides with the position of the projected portion arising not from the indicator but from the "deflection." Accordingly, even if the center of gravity of the region S2 is derived, merely the central position of the "deflection" is obtained, but the position of the indicator is not obtained. In other words, the position of the indicator cannot be detected correctly.

For such a subject as just described, for example, like Patent Document 2, it seems a possible idea to dynamically change the threshold value by multiplying an average value of detection values of the capacitance by a predetermined coefficient (for example, ½). However, as apparent from FIGS. 26A and 26B, even if the threshold value is dynamically changed in this manner, merely a threshold value suitable for detection of a central position of a projected portion arising from "distortion+indicator" is obtained, and it is difficult to make it possible to detect a central position only of the projected portion arising from the indicator.

Such a subject as described above is a subject that arises not only in a case in which "deflection" occurs in a touch detection apparatus of the air gap type but also in a case in which a projected portion having a width greater than that of a projected portion arising from an indicator appears from some other reason such as a touch by a palm. Accordingly, one of objects of the present disclosure resides in the provision of a touch detection method, a touch detection apparatus, and a touch sensor controller by which, even when a projected portion having a width greater than that of a projected portion arising from an indicator appears, only the projected portion arising from the indicator can be detected appropriately.

Further, a touch detection apparatus of the air gap type has a subject that a hysteresis occurs with "deflection." In particular, for example, even if the indicator is spaced away from the touch face, "deflection" caused by a touch by an indicator does not disappear immediately but gradually disappears over a certain amount of time (for example, over several milliseconds). Also in the meantime, since position detection by the touch detection apparatus continues, while the projected portion by "deflection" becomes sufficiently small, the center of gravity of the projected portion by the "deflection" continues to be derived as the position of the indicator.

Accordingly, another one of the objects of the present disclosure resides in the provision of a touch detection method, a touch detection apparatus, and a touch sensor controller by which detection in error of a position of an indicator caused by a hysteresis of "deflection" can be prevented.

Further, the inventor of the present application has newly discovered that, although a touch detection apparatus is frequently formed in a size in which it can be held by one hand, if a touch detection apparatus of the air gap type is used in a state in which it is held by one hand in such a way to hold it as depicted in FIG. 3E as hereinafter described, then pressure is applied to the rear face of the touch detection apparatus through the hand of the user, whereupon a projected portion of a greater width similar to that when the touch face is touched by a palm is sometimes detected. In the following description, such a holding way of a touch detection apparatus as just described is referred to as "back face supporting."

Although such back face supporting cannot occur with a touch detection apparatus utilized in an operation unit of a multifunction peripheral apparatus that executes scanning or copying (refer to FIGS. 19 and 21 of Patent Document 3) like the touch detection apparatus of Patent Document 3, the back face supporting is performed frequently with a tablet apparatus or a like apparatus with which reduction in thickness and in weight has processed notably in recent years. In the calibration described in Patent Document 3, not only a projected portion of a great width caused by the back face supporting but also a projected portion of a great width caused by a touch of a palm with the touch face are canceled without distinction from the difference value.

Here, in a touch detection apparatus for universal use such as a tablet terminal, different from a touch detection apparatus that is an operation unit of a multifunction peripheral apparatus, like the touch detection apparatus of Patent Document 3, that is frequently restricted in operation such as menu selection, it is considered not preferable to perform such calibration as described above.

Originally, to perform calibration is to determine a detection value of a capacitance being detected at present as a reference state. If calibration is performed while a touch is being performed, then the reference state follows up the detection value. Accordingly, to execute detection of a touch while calibration is being performed is an inherently contradictory relationship. For example, if it is tried to utilize a position indicator different from a finger and called a touch pen or passive pen on a tablet terminal similarly as in a case in which drawing is performed on paper placed on a desk with a writing instrument, then a side face of a palm gripping the position indicator is placed on the touch face first. Here, if calibration is executed in a state in which the state of the capacitance caused by the side face of the palm is maintained, then even if the user thereafter starts inputting by the tablet terminal using the position indicator in the state in which the side face of the palm of the user is placed on the touch face, there is the possibility that detection through the indicator (or the forefinger) may result in failure at the instant. This is the reason why it is not very preferable to perform calibration in a touch detection apparatus for universal use.

However, in the case of the "back face supporting," immediate use of a touch pen occurs less frequently on experience in comparison with such a situation as described above in which a side face of a palm is placed on a tablet placed on a desk and touch inputting from now on is expected. This is because, for example, different from a situation in which a side face of a palm is placed, in the case of the back face supporting, a utilization form in which a moving image or like is browsed is available. Accordingly, as regards a projected portion by the "back face supporting," a situation in which it is preferable to perform calibration to cancel the projected portion frequently occurs in comparison with a case in which a side face of a palm is placed. However, conventionally a method for selectively extracting a projected portion of a great width caused by the back face supporting is not available, and as a result, the conventional touch detection apparatus has a subject that it cannot execute calibration taking only a projected portion of a great width caused by the back face supporting as a target.

Accordingly, a further one of the objects of the present disclosure resides in provision of a touch detection method, a touch detection apparatus, and a touch sensor controller by which calibration can be executed only taking a projected portion of a great width caused by the back race supporting as a target.

According to a first aspect of the present disclosure, there is provided a touch detection method performed by a controller of a touch sensor of a capacitive type including a plurality of sensor electrodes, the touch detection method including acquiring a plurality of detection values at a plurality of crossing positions of the sensor electrodes, each of the detection values corresponding to a capacitance between an indicator and the touch sensor at one of the crossing positions, acquiring a maximum value among the detection values at the crossing positions, determining a first threshold value by subtracting a subtraction value, which is a fixed value or a value that decreases as the maximum value increases, from the maximum value, and deriving a position of the indicator based on the detection values at the crossing positions with reference to the first threshold value.

It is to be noted that the touch detection method may further include re-setting, in response to determining that the first threshold value has a decreased value, the first threshold value to a value higher than the first threshold value determined by the determining of the first threshold value, the deriving of the position of the indicator including deriving the position of the indicator based on the detection values for the crossing positions with reference to the re-set first threshold value.

According to the first aspect of the present disclosure, there is further provided a touch detection apparatus including a plurality of sensor electrodes configuring a touch sensor of a capacitive type, a touch detection circuit which, in operation, acquires a plurality of detection values for a plurality of crossing positions of the sensor electrodes, a capacitance value indicative of a capacitance between an indicator and the touch sensor at one of the crossing positions, and a coordinate derivation circuit which, in operation, acquires a maximum value among the detection values, determines a first threshold value to a value obtained by subtracting a subtraction value, which is a fixed value or a value that decreases as the maximum value increases, from the maximum value, and derives a position of the indicator based on the detection values for the crossing positions with reference to the first threshold value.

According to the first aspect of the present disclosure, there is further provided a touch sensor controller for use with a plurality of sensor electrodes that configure a touch sensor of a capacitive type, the touch sensor controller including a touch detection circuit which, in operation, acquires a plurality of capacitance values at a plurality of crossing positions of the sensor electrodes, each of the capacitance values indicative of a capacitance between an indicator and the touch sensor at one of the crossing positions, and a coordinate derivation circuit which, in operation, acquires a maximum value among a plurality of detection values for the crossing positions that is based on the capacitance values at the crossing positions, determines a first threshold value to a value obtained by subtracting a subtraction value, which is a fixed value or a value that decreases as the maximum value increases, from the maximum value, and derives a position of the indicator based on the detection values for the crossing positions with reference to the first threshold value.

According to the first aspect of the present disclosure, after a maximum value is detected, a first threshold value that is made a reference for position derivation is determined from a value obtained by subtracting the subtraction value from the maximum value. Therefore, even if a projected portion (hereinafter referred to as "wide projected portion") having a width greater than that of a projected portion by an indicator (hereinafter referred to as "indicator projected portion") appears, only the indicator projected portion can be detected appropriately.

It is to be noted that, although the subtraction value may be a fixed value, preferably it is a value that decreases as the detected maximum value increases. This is because there is a tendency that, while the maximum value that is detected increases as the height of the wide projected portion increases, as the height of the wide projected portion increases, the height of the indicator projected portion positioned on the wide projected portion (height from the top of the wide projected portion) decreases.

Further, according to a modification to the first aspect of the present disclosure, since the first threshold value is re-set to a higher value in a scene in which the first threshold value has a reduced value, reduction of the first threshold value can be retarded. Accordingly, since derivation of the position of the indicator with reference to the first threshold value is not performed any more in such a scene as described above, detection in error of the position of the indicator cause by a hysteresis of "deflection" can be prevented.

According to a second aspect of the present disclosure, there is provided a touch detection method performed by a controller of a touch sensor of a capacitive type including a plurality of sensor electrodes, the touch detection method including acquiring plurality of a reference values for a plurality of crossing positions of the sensor electrodes, each of the reference values corresponding to one of the crossing positions, acquiring a plurality of capacitance values for the crossing positions, each of the capacitance values indicative of a capacitance at one of the crossing positions, acquiring a plurality of detection values for the crossing positions, each of the detection values corresponding to a capacitance between an indicator and the touch sensor based on the capacitance value and the reference value, calculating a representative position of a region indicated by each of the crossing positions at which the corresponding one of the detection values exceeds a first threshold value, deciding a presence or an absence of movement of the representative position, and performing, in response to a result of the deciding of the presence or the absence of movement, a calibration procedure that calibrates the reference values in a direction in which the reference values approach the detection values.

According to the second aspect of the present disclosure, there is further provided a touch detection apparatus including a plurality of sensor electrodes configuring a touch sensor of a capacitive type, a touch detection circuit which, in operation, acquires a plurality of reference values for a plurality of crossing positions of the sensor electrodes, acquires a plurality of capacitance values, each of the capacitance values indicative of a capacitance at one of the crossing positions, and further calculates a plurality of difference values, each of the difference values obtained by subtracting one of the reference values for one of the crossing positions from one of the capacitance values for the one of the crossing positions, and a coordinate derivation circuit which, in operation, calculates a representative position of a region indicated by each of the crossing positions at which one of the difference values or a detection value acquired based on the one of the difference values exceeds a first threshold value, decides a presence or an absence of movement of the representative position, and performs a calibration procedure that calibrates the reference values in a direction in which the reference values approach the detection values based on the presence or the absence of movement of the representative position.

According to the second aspect of the present disclosure, there is further provided a touch sensor controller for use with a plurality of sensor electrodes that configure a touch sensor of a capacitive type, the touch sensor controller including a touch detection circuit which, in operation, acquires a plurality of reference values for a plurality of crossing positions of the sensor electrodes, each of the reference values corresponding to one of the crossing positions, acquires a plurality of capacitance values, each of the capacitance values indicative of a capacitance at one of the crossing positions, and calculates a plurality of difference values for the crossing positions, each of the difference values obtained by subtracting one of the reference values for one of the crossing positions from the one of the capacitance value values for the one of the crossing positions, and a coordinate derivation circuit which, in operation, calculate a representative position of a region indicated by each of the crossing positions at which one of the difference values or a detection value acquired based on the one of the difference values exceeds a first threshold value, decides a presence or an absence of movement of the representative position, and performs a calibration procedure that calibrates the reference values in a direction in which the reference values approach the detection values based on the presence or the absence of movement of the representative position.

According to the second aspect of the present disclosure, since the calibration procedure is performed only when the representative position has not moved, only a wide projected portion arising from the back face supporting can be made a target of the calibration. It is to be noted that the second aspect of the present disclosure has been made based on new findings that a wide projected portion is sometimes caused by performing the back face supporting and that, when the back face supporting is performed, although the touch detection apparatus itself is sometimes shaken much, since the relative positional relationship between a fulcrum (a plurality of fingers) at which the back face is supported and the touch detection apparatus does not vary, the wide projected portion caused by performing the back face supporting little moves even if time passes in comparison with a wide projected portion arising from a palm touching with the touch face, and accordingly, the wide projected portions can be distinguished from each other by detecting presence or absence of such movement.

Further, according to the second aspect of the present disclosure, since calibration procedure is performed when it is decided that the wide projected portion arises from the back face supporting, in a case in which the back face supporting is continued for a little while like a case in which a moving image is being viewed, it is possible to stop detection of a touch. Consequently, it is possible to stop a calculation process in response to touch detection, issuance of a notification itself of information to which an invalidity flag is added to a host central processing unit (CPU) (e.g., a microprocessor), an interrupt process and so forth.

BRIEF DESCRIPTION OF THE DRAWINGS

FIGS. 12A and 12B views depicting a locus of movement of the center of gravity of a projected portion over a predetermined period of time, in which FIG. 12A depicts a locus of movement of the center of gravity of a projected portion detected in the state depicted in FIG. 3E and FIG. 12B depicts a locus of movement of the center of gravity of a projected portion detected in the state depicted in FIG. 3D;

DETAILED DESCRIPTION

In the following, a preferred embodiment of the present disclosure is described in detail with reference to the accompanying drawings.

Figure 1:
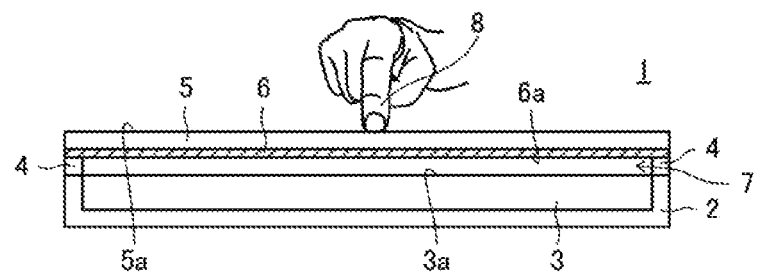
FIG. 1 is a sectional view of a touch detection apparatus according to an embodiment of the present disclosure.
Figure 2:
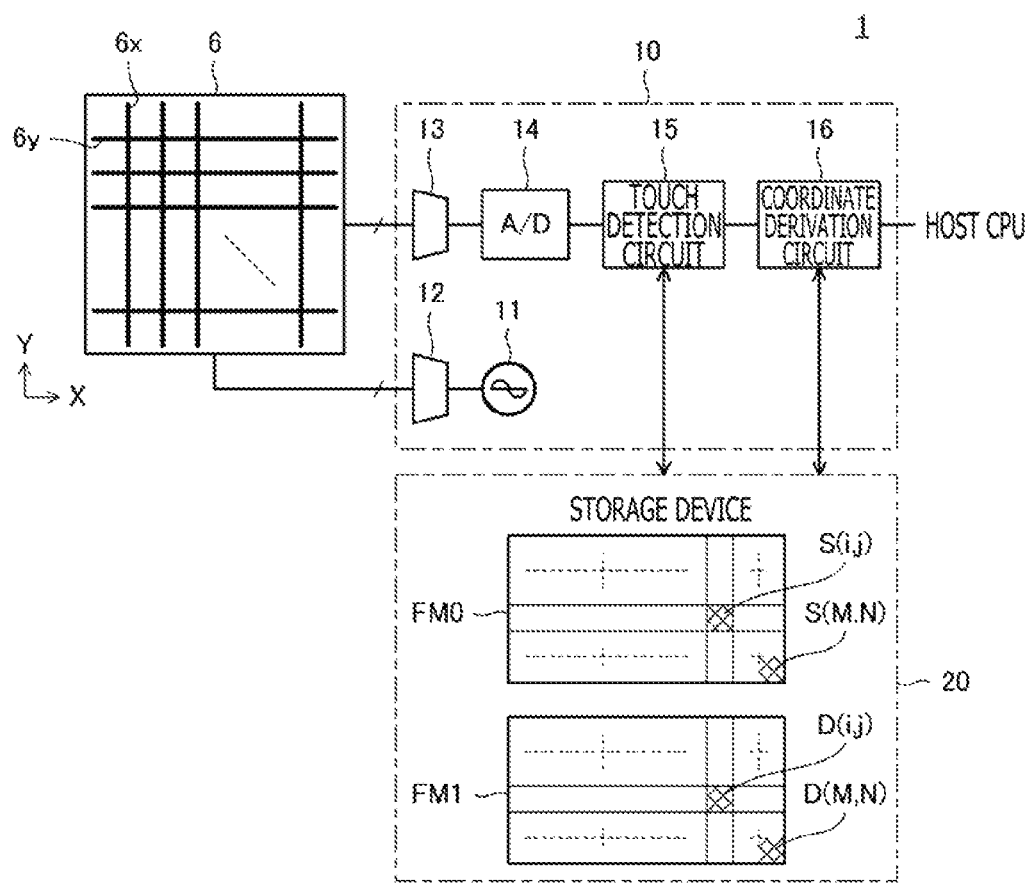
FIG. 2 is a schematic block diagram of the touch detection apparatus according to the embodiment of the present disclosure.

FIG. 1 is a sectional view of a touch detection apparatus 1 according to the present embodiment, and FIG. 2 is a substantially block diagram depicting functional blocks of the touch detection apparatus 1.

As depicted in FIG. 1, the touch detection apparatus 1 is configured including a housing 2 formed in a shape of a box of a substantially rectangular solid having no lid, a display apparatus 3 accommodated in the housing 2 with a display face 3a thereof directed upwardly, a transparent cover panel 5 arranged above the display face 3a, a touch sensor 6 pasted to a lower face of the cover panel 5 (opposing face to the display face 3a), and a spacer 4 that supports the cover panel 5 and the touch sensor 6. It is to be noted that the spacer 4 is arranged over an overall periphery of an edge of the housing 2. The touch detection apparatus 1 is configured further including a touch sensor controller 10, a storage device 20, and a host CPU as depicted in FIG. 2. A touch detection method according to the present embodiment is executed by the touch sensor controller 10.

As depicted in FIG. 1, in the touch detection apparatus 1, an upper face of the cover panel 5 configures a touch face 5a. An inputting operation for the touch detection apparatus 1 is executed by moving an indicator such as a finger 8 depicted in FIG. 1 on the touch face 5a. It is to be noted that, although, as the indicator for the touch sensor 6, an electronic pen or the like ready for the capacitive method can be used in addition to the finger 8 depicted in FIG. 1, the following description is given assuming that the finger 8 is used as the indicator in order to simplify the description. Further, the touch sensor 6 and the display face 3a do not contact closely with each other, and a fixed space (air gap 7) is provided between them. In short, the touch detection apparatus 1 is a touch detection apparatus of the air gap type described hereinabove.

The display apparatus 3 is an apparatus for displaying characters or images under the control of the host CPU depicted in FIG. 2. Although it is suitable to particularly use, as the display apparatus 3, a liquid crystal display device or an organic electroluminescence (EL) display device, also it is possible to configure the display apparatus 3 using a display device other than them.

The touch sensor 6 is of the capacitive type and is configured such that a plurality of X electrodes $6x$ individually extending in a Y direction (one direction in the touch face 5a depicted in FIG. 1) and arranged at equal distances in an X direction and a plurality of Y electrodes $6y$ individually extending in the X direction and arranged at equal distances in the Y direction. The X electrodes $6x$ and the Y electrodes $6y$ are arranged in a crossing relationship with each other, and configure sensor electrodes of the touch sensor 6. Each of the X electrodes $6x$ and the Y electrodes $6y$ is configured from a transparent conductive material such as an indium tin oxide (ITO) transparent conductive film. Accordingly, a user of the touch detection apparatus 1 can see the display face 3a of the display apparatus 3 through the touch face 5a. If the finger 8 touches with the touch face 5a, then a capacitance is generated between the finger 8 and the X electrodes $6x$ and the Y electrodes $6y$ located in the proximity of the finger 8. The touch sensor controller 10 depicted in FIG. 2 is configured such that it utilizes a variation of the capacitance to detect the position of the finger 8 on the touch face 5a. This point is hereinafter described in detail.

The cover panel 5 is configured from a transparent material having a high strength against the pressing force to the touch face 5a such as, for example, glass or plastic. However, if the user depresses the touch face 5a strongly, then the cover panel 5 is deflected in a direction of the display face 3a together with the touch sensor 6. Since this deflection has an influence on the capacitance described above, it has an influence also on detection of the finger 8 by the touch sensor controller 10. Also this point is hereinafter described in detail.

The touch sensor controller 10 is configured having an oscillator 11, multiplexers 12 and 13, an analog to digital converter (A/D) 14, a touch detection circuit 15, and a coordinate derivation circuit 16 as depicted in FIG. 2.

The oscillator 11 is a circuit that oscillates a signal of a predetermined frequency. The multiplexer 12 is a circuit that has a role of selecting the plurality of X electrodes $6x$ successively one by one at predetermined intervals of time and connecting the selected X electrode $6x$ to the oscillator 11. By this work of the multiplexer 12, signals outputted from the oscillator 11 are successively and individually supplied to the plurality of X electrodes $6x$. The signals supplied to the X electrodes $6x$ are supplied to the respective Y electrodes $6y$ through crossing positions (i,j) with the Y electrodes $6y$. Here, i and j are natural numbers indicative of serial numbers of the X electrodes $6x$ and the Y electrodes $6y$, respectively, and a combination (i,j) of i and j indicates coordinates of each crossing position on the touch face 5a. Maximum values of i and j are M and N as depicted in FIG. 2 individually.

The multiplexer 13 is a circuit that plays a role of selecting the plurality of Y electrodes $6y$ successively one by one at predetermined intervals of time and connecting the selected Y electrode $6y$ to an input terminal of the analog to digital converter 14. The analog to digital converter 14 has a function of performing sampling and quantization for a signal supplied from each Y electrode 6*y* to generate a digital signal and supplying the generated digital signal to the touch detection circuit 15.

If the finger 8 is positioned in the proximity of some crossing position (i,j), then a capacitance is generated between an X electrode 6*x* and a Y electrode 6*y* positioned in the proximity of the crossing position (i,j) and the finger 8 and the signal is absorbed in a direction toward the human body. As a result, the amplitude of a signal to be supplied from the Y electrode 6*y* to the analog to digital converter 14 decreases, and this is reflected on the value of the digital signal. The touch detection circuit 15 is configured such that it acquires, for each crossing position (i,j), a capacitance C(i,j) indicative of the capacitance between the finger 8 and the touch sensor 6 on the basis of the variation of the amplitude reflected on the value of the digital signal in this manner. It is to be noted that, as a particular circuit configuration of the touch detection circuit 15, for example, such a hardware circuit as a programmable logic controller is used.

The touch detection circuit 15 has also a function for converting a capacitance C(i,j) into a difference value D(i,j) (detection value corresponding to the capacitance between the finger 8 and the touch sensor 6). Describing particularly, the storage device 20 includes a frame memory FM0 for storing a reference value S(i,j) for each crossing position (i,j) and a frame memory FM1 for storing a difference value D(i,j) for each crossing position (i,j) as depicted in FIG. 2. The touch detection circuit 15 reads out, for each crossing position (i,j), a reference value S(i,j) from the frame memory FM0 and performs a process for subtracting the read out reference value S(i,j) from a corresponding capacitance C(i,j) in accordance with an expression (1) given below. The touch detection circuit 15 is configured such that it stores a numerical value obtained as a result of the subtraction as a difference value D(i,j) corresponding to each crossing position (i,j) into the frame memory FM1.

$$D(i,j)=C(i,j)-S(i,j) \tag{1}$$

The touch detection circuit 15 has, in addition to the functions described above, a function for deciding whether or not there exists a difference value D(i,j) that is higher than a touch detection threshold value T2 (second threshold value stored in advance therein, refer to FIG. 13 hereinafter described) and causing the coordinate derivation circuit 16 to perform coordinate derivation only when it is decided that there exists such a difference value D(i,j) as described above, a function for performing calibration of a reference value S(i,j) on the basis of an instruction of the coordinate derivation circuit 16 and so forth. However, details of the functions are hereinafter described with reference to FIGS. 13 and 14.

The coordinate derivation circuit 16 has a function for acquiring a maximum value among a plurality of difference values D(i,j) stored in the frame memory FM1 and subtracting a subtraction value R from the maximum value to calculate a touch detection threshold value T1 (first threshold value) and a function for deriving the position of the finger 8 based on the difference value D(i,j) for each crossing position (i,j) with reference to the calculated touch detection threshold value T1. Further, the coordinate derivation circuit 16 has also a function for calculating the center GCur of gravity (representative position) of a region indicated by one or a plurality of crossing positions (i,j) whose difference value D(i,j) exceeds the touch detection threshold value T1, deciding whether or not the center GCur of gravity indicates a movement, and activating a calibration process for calibrating each reference value S(i,j) in a direction approaching the difference value D(i,j) in response to a result of the decision. The coordinate derivation circuit 16 is configured from an integrated circuit such as, for example, a microprocessor unit (MPU) and is configured such that it executes a program supplied thereto from the outside to implement several functions including the three functions described above.

Also details of the functions of the coordinate derivation circuit 16 are hereinafter described separately with reference to FIGS. 13 and 14.

An outline of the touch detection apparatus 1 has been described above. Now, the difference values D(i,j) stored in the frame memory FM1 are described for each state of the positional relationship between a hand of a user (including the finger 8) and the touch detection apparatus 1 taking particular examples.

Figure 3A:
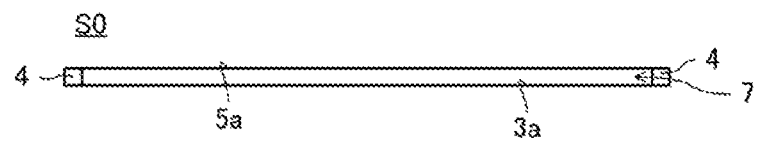
FIG. 3A is a schematic view depicting a state in which a hand of a user does not exist in the proximity of the touch detection apparatus.
Figure 3B:
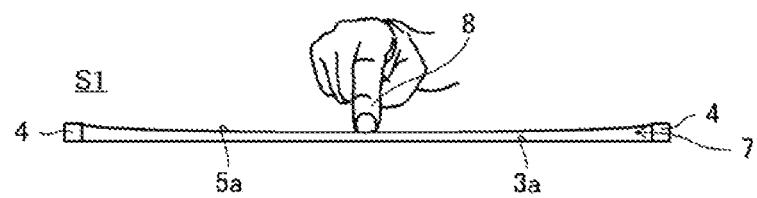
FIG. 3B is a schematic view depicting another state in which a portion in the proximity of the center of a touch face is depressed by a finger.
Figure 3C:
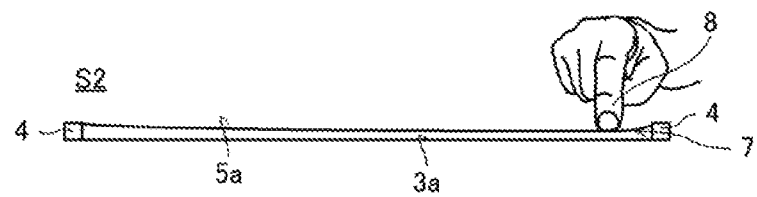
FIG. 3C is a schematic view depicting a further state in which a portion in the proximity of an end portion of the touch face is depressed by the finger.
Figure 3D:
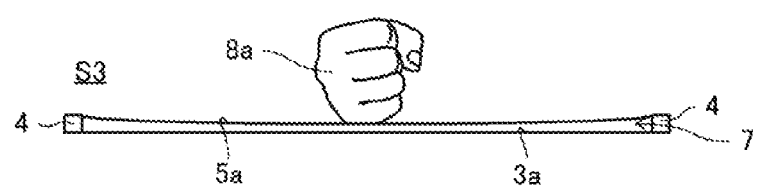
FIG. 3D is a schematic view depicting a still further state in which a portion in the proximity of the center of the touch face is depressed by a fist.
Figure 3E:
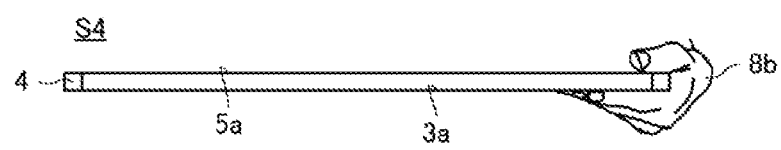
FIG. 3E is a schematic view depicting a yet further state in which the touch detection apparatus is back face supported by a palm.
Figure 3F:
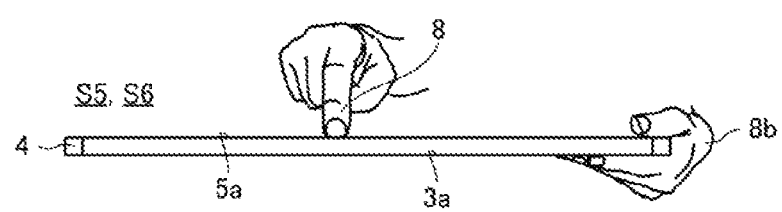
FIG. 3F is a schematic view depicting a yet further state in which a portion in the proximity of the center of the touch face is depressed by the finger while the touch detection apparatus is back face supported by the palm.

FIGS. 3A to 3F are schematic views depicting states of the positional relationship between a hand of a user and the touch detection apparatus 1. It is to be noted that, in FIGS. 3A to 3F, the cross section of the touch detection apparatus 1 is depicted in a somewhat simplified form. FIG. 3A depicts a state (state S0) in which a hand of a user does not exist in the proximity of the touch detection apparatus 1. Meanwhile, FIG. 3B depicts a state (state S1) in which a portion in the proximity of the center of the touch face 5*a* is depressed by the finger 8. FIG. 3C depicts a state (state S2) in which a portion in the proximity of an end portion of the touch face 5*a* is depressed by the finger 8. FIG. 3D depicts a state (state S3) in which a portion in the proximity of the center of the touch face 5*a* is depressed by a fist 8*a*. FIG. 3E depicts a state (state S4) in which the touch detection apparatus 1 is back face supported by a palm 8*b*. FIG. 3F depicts a state (states S5 and S6) in which a portion in the proximity of the center of the touch face 5*a* is depressed by the finger 8 while the touch detection apparatus 1 is back face supported by the palm 8*b*.

Figure 4A:
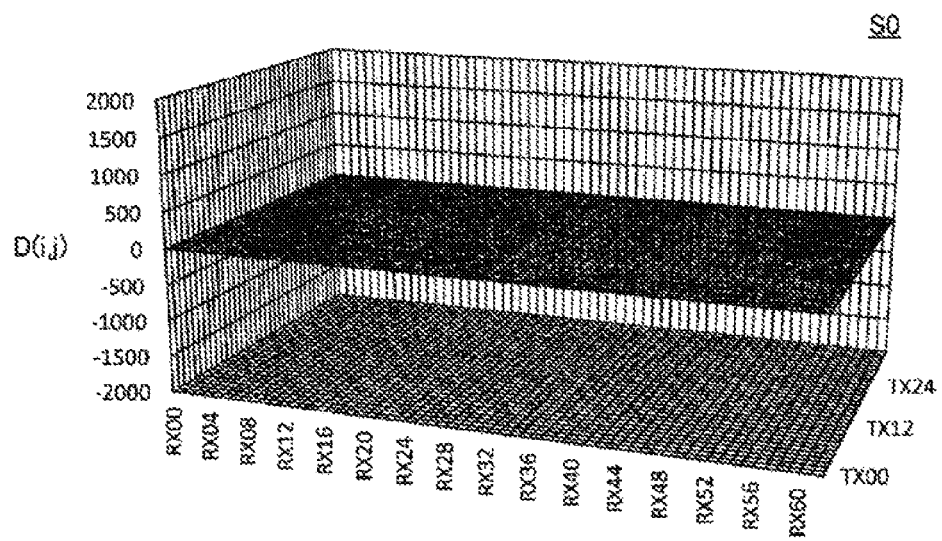
FIGS. 4A and 4B are views depicting an example of a difference value in the state depicted in FIG. 3A.
Figure 4B:
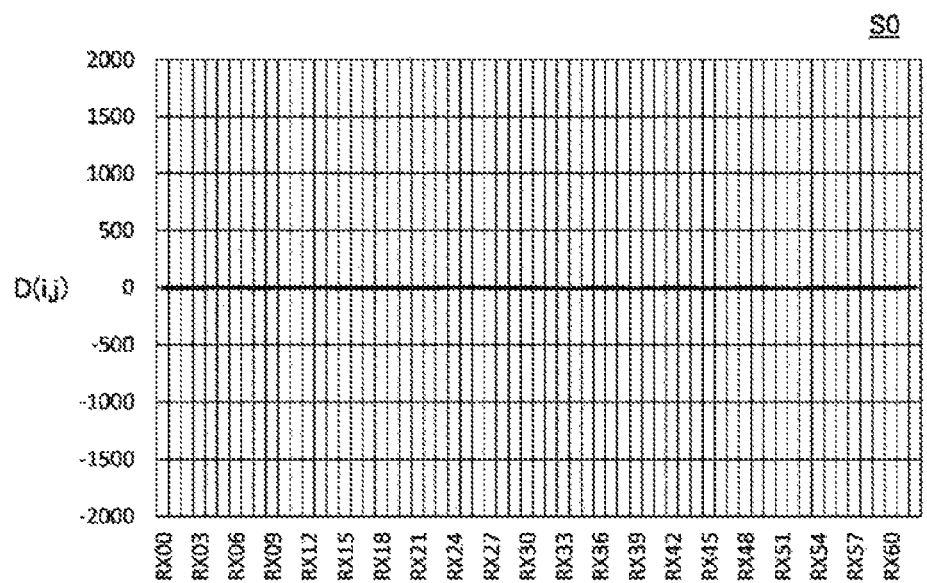

FIGS. 4A and 4B are views depicting an example of the difference value D(i,j) in the state S0 depicted in FIG. 3A. It is to be noted that FIGS. 4A and 4B depict an example in which 36 X electrodes 6*x* denoted by TX00 to TX35 and 63 Y electrodes 6*y* denoted by RX00 to RX62 are provided. In FIG. 4A, the depth axis represents X coordinates, the axis of abscissa represents Y coordinates, and the axis of ordinate represents the difference values D(i,j). Meanwhile, in FIG. 4B, the axis of abscissa indicates Y coordinates and the axis of ordinate represents the difference values D(i,j). FIG. 4B is a view when the illustration of FIG. 4A is viewed in the depthwise direction. These matters similarly apply also to FIGS. 5A to 11B that are hereinafter referred to. However, in FIGS. 5A and 5B, the reference values S(i,j) are used in place of the difference values D(i,j).

Figure 5A:
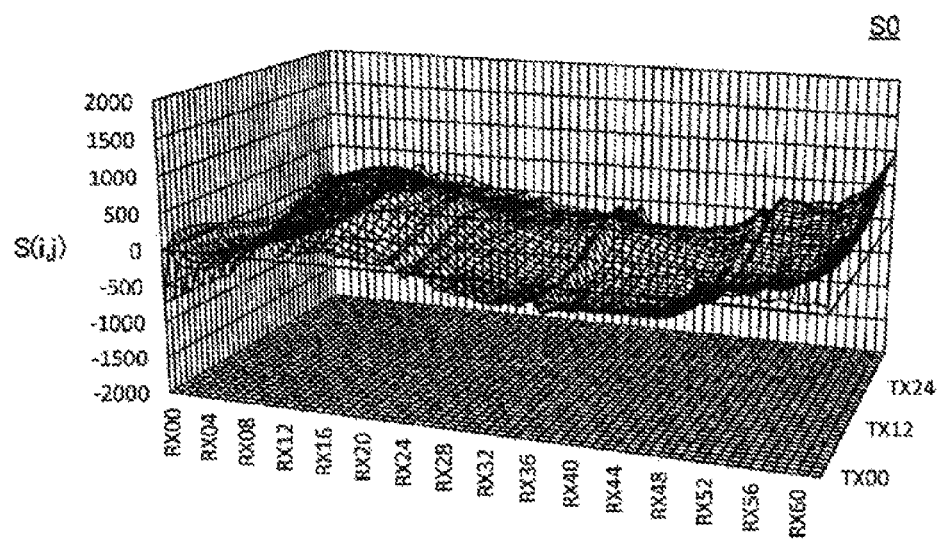
FIGS. 5A and 5B are views depicting an example of a reference value in the state depicted in FIG. 3A.
Figure 5B:
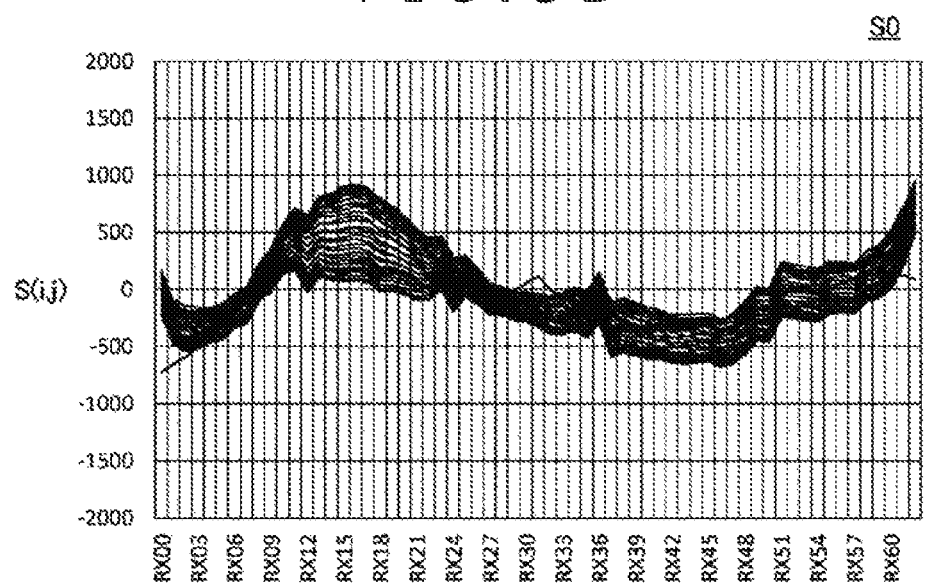

As depicted in FIGS. 4A and 4B, the difference value D(i,j) in the state S0 is almost zero at any position on the touch face 5*a*, and this indicates that any indicator including a hand of a user does not exist in the proximity of the touch detection apparatus 1. However, also in this case, the capacitance C(i,j) usually differs among different coordinates, and in order to obtain such uniform difference values D(i,j) as depicted in FIGS. 4A and 4B, it is necessary to perform adjustment of the reference values S(i,j) in advance. FIGS. 5A and 5B depict an example of the reference values S(i,j) adjusted in this manner.

Figure 6A:
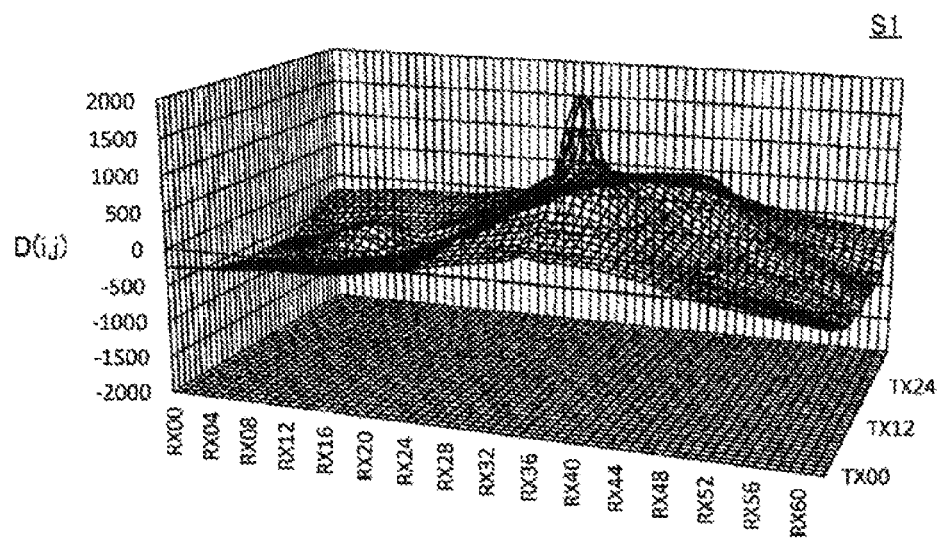
FIGS. 6A and 6B are views depicting an example of the difference value in the state depicted in FIG. 3B.
Figure 6B:
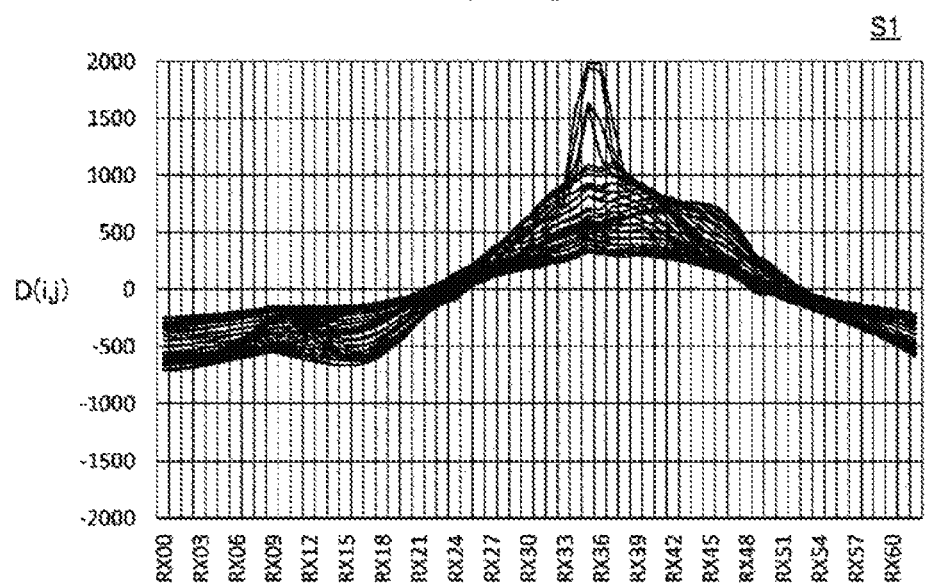

FIGS. 6A and 6B are views depicting an example of difference values D(i,j) in the state S1 depicted in FIG. 3B. In FIGS. 6A and 6B, a projected portion appearing in the proximity of the center of the touch face 5*a* is an indicator projected portion that reflects a capacitance generated between the finger 8 positioned in the proximity of the center of the touch face 5a and the touch sensor 6. While, in FIGS. 6A and 6B, the difference value D(i,j) is high also around the indicator projected portion, this is a wide projected portion caused by deflection of the touch sensor 6. In particular, as exemplified in FIG. 3B, depending upon the pressing force of the finger 8, deflection is sometimes generated in the touch sensor 6 by depression of the touch face 5a. As the variation of the position of the touch sensor 6 caused by the deflection increases, the capacitance C(i,j) detected by the touch detection circuit 15 increases, and therefore, a wide projected portion appears in the proximity of the depression point as depicted in FIGS. 6A and 6B.

One of the characteristics of the touch detection apparatus 1 according to the present embodiment resides in that it is implemented to detect, even where a wide projected portion is generated in this manner, only an indicator projected portion appropriately. To this end, in the present embodiment, the touch detection threshold value T1 obtained by subtracting a subtraction value R from a maximum value of the difference value D(i,j) is utilized. Details are hereinafter described with reference to FIGS. 13 and 14.

Figure 7A:
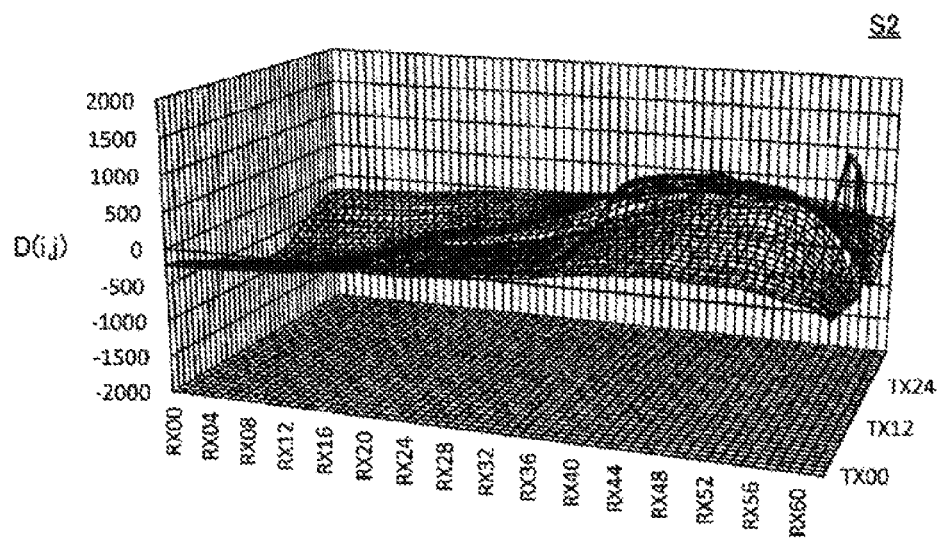
FIGS. 7A and 7B are views depicting an example of the difference value in the state depicted in FIG. 3C.
Figure 7B:
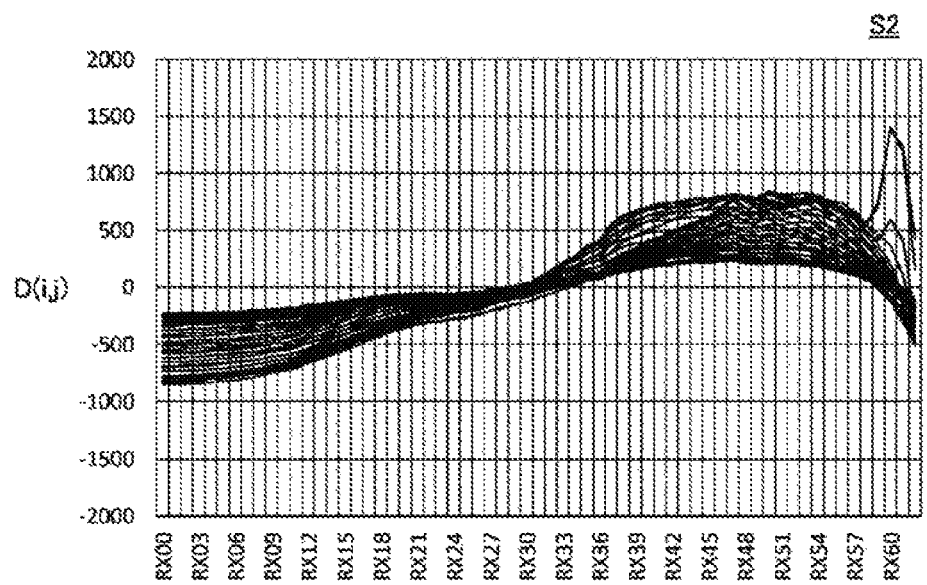

FIGS. 7A and 7B are views depicting an example of the difference values D(i,j) in the state S2 depicted in FIG. 3C. In FIGS. 7A and 7B, a projected portion appearing in the proximity of an end portion of the touch face 5a is an indicator projected portion that reflects a capacitance generated between the finger 8 positioned in the proximity of an end portion of the touch face 5a and the touch sensor 6. Although this indicator projected portion is small in comparison with the indicator projected portion of FIGS. 6A and 6B, this arises from that the sensitivity of the touch sensor 6 is low in the proximity of the end portion of the touch face 5a. Further, since, also in this case, the difference value D(i,j) is high around the indicator projected portion, this is a wide projected portion caused by deflection of the touch sensor 6 similarly as in the case of FIGS. 6A and 6B. Since the depression point is at an end portion of the touch face 5a, the indicator projected portion by the finger 8 is positioned in the proximity of an end portion of the wide projected portion by deflection.

Figure 8A:
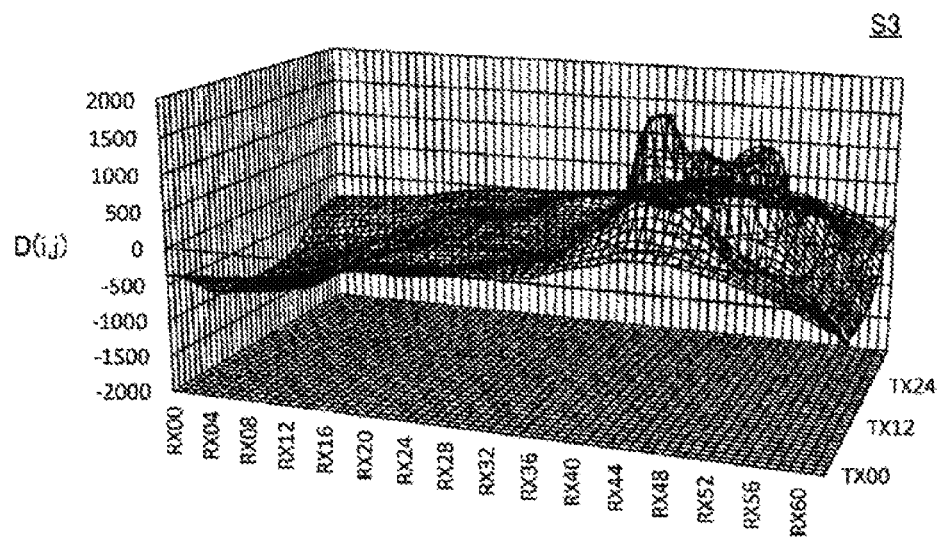
FIGS. 8A and 8B are views depicting an example of the difference value in the state depicted in FIG. 3D.
Figure 8B:
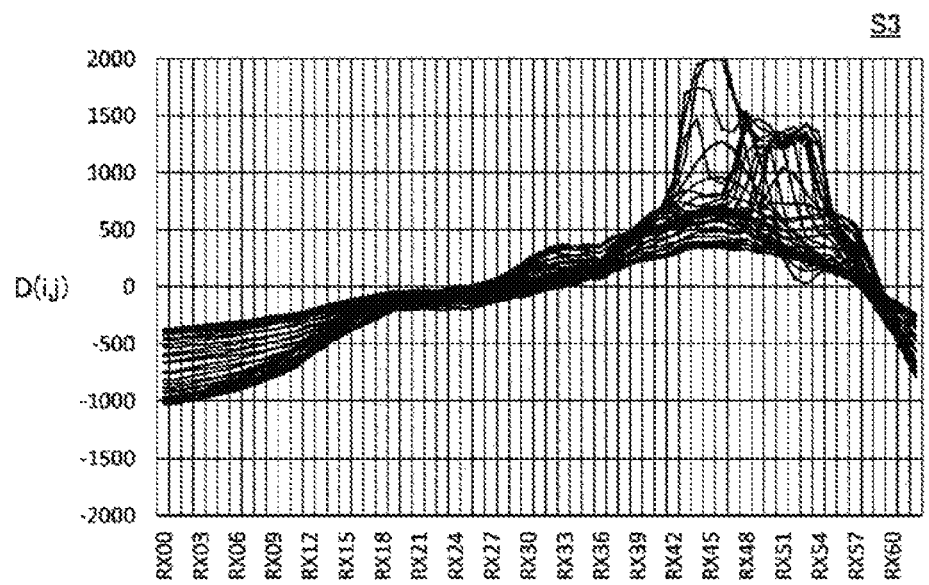

FIGS. 8A and 8B are views depicting an example of the difference values D(i,j) in the state S3 depicted in FIG. 3D. In FIGS. 8A and 8B, no indicator projected portion is generated, but on a wide projected portion that is relatively wide, a relatively narrow wide projected portion is generated. The latter wide projected portion reflects a capacitance generated between the fist 8a and the touch sensor 6, and the former wide projected portion is caused by deflection of the touch sensor 6.

Figure 9A:
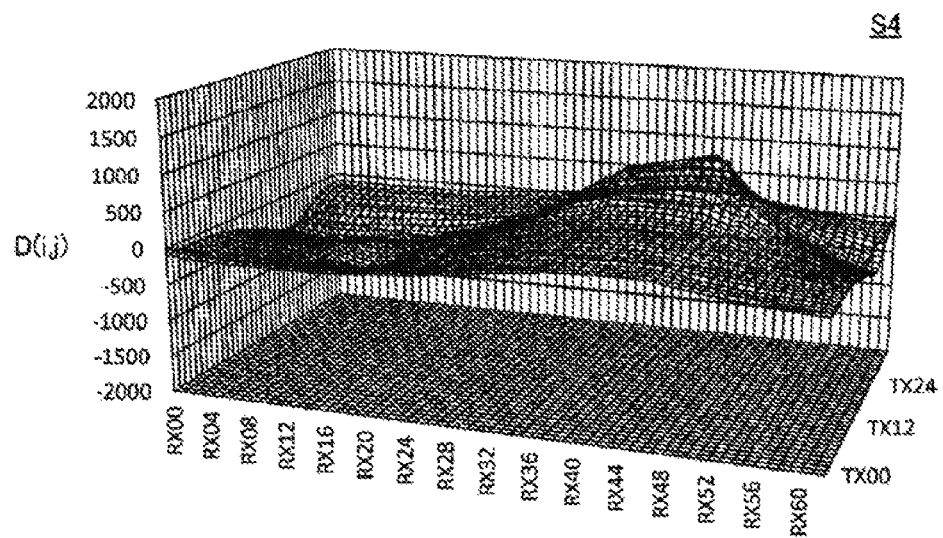
FIGS. 9A and 9B are views depicting an example of the difference value in the state depicted in FIG. 3E.
Figure 9B:
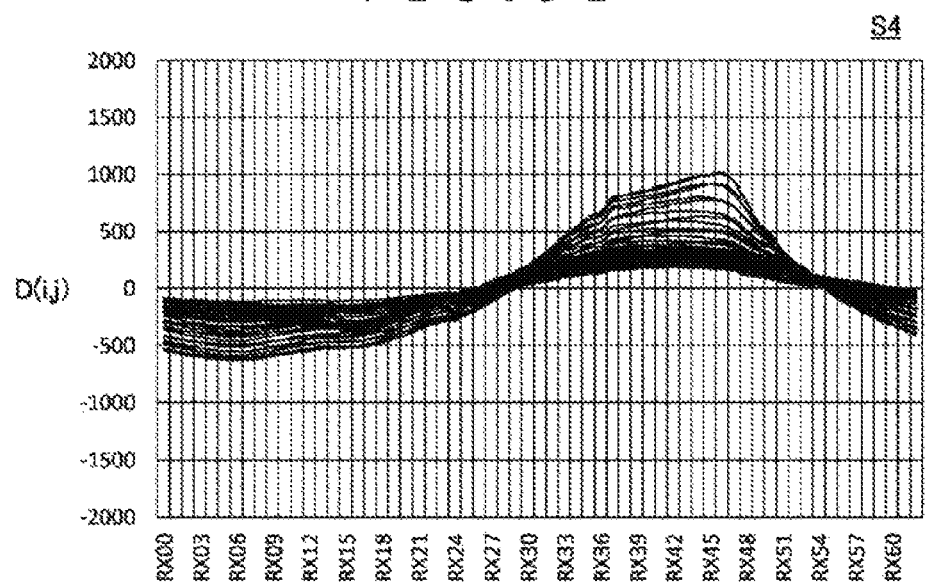

FIGS. 9A and 9B are views depicting an example of the difference values D(i,j) in the state S4 depicted in FIG. 3E. Also in FIG. 3E, no indicator projected portion is generated, but one wide projected portion is generated. This wide projected portion is caused by the back face supporting and has a characteristic, in comparison with the wide projected portion by the fist 8a depicted in FIGS. 8A and 8B or with the wide projected portion by deflection caused by depression of the touch face 5a, that the center of gravity thereof does not move.

Figure 12A:
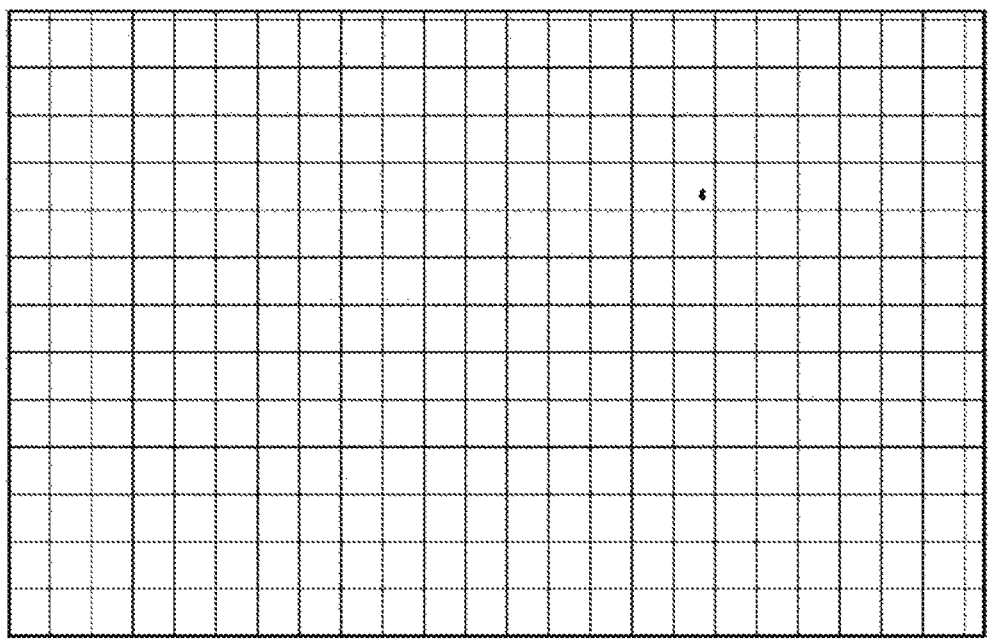
Figure 12B:
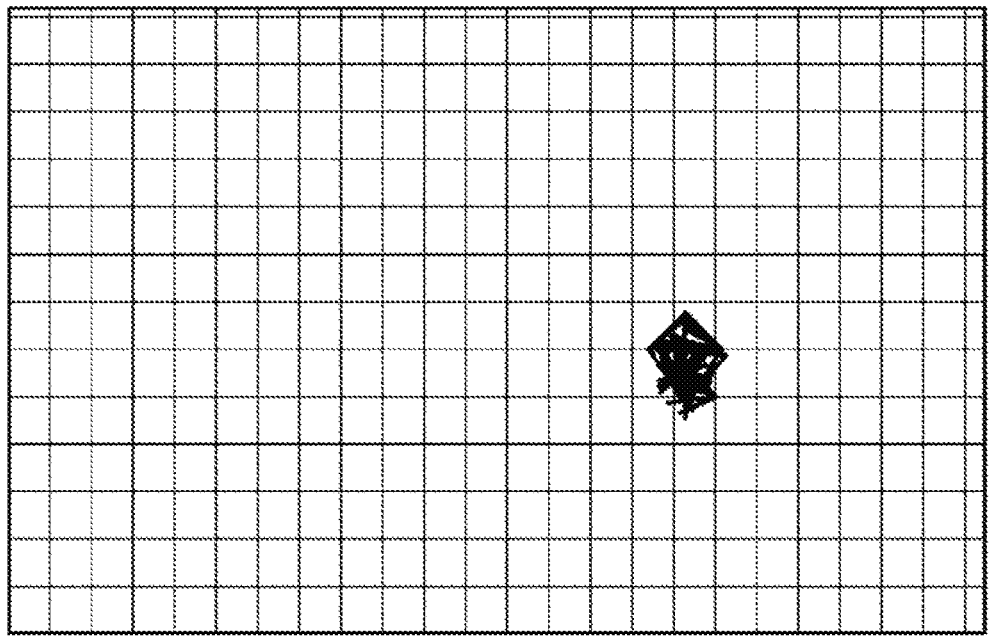

This characteristic is described by taking a particular example. FIGS. 12A and 12B depict loci of movement of the center of gravity of a projected portion over a predetermined period of time. FIG. 12A depicts a locus of movement of the center of gravity of a wide projected portion detected in the state S4 depicted in FIG. 3E, and FIG. 12B depicts a locus of movement of the center of gravity of a wide projected portion detected in the state S3 depicted in FIG. 3D. As can be recognized from FIGS. 12A and 12B, the center of gravity of a wide projected portion caused by the back face supporting indicates little movement in comparison with the center of gravity of a wide projected portion caused by the fist 8a. In this manner, a wide projected portion arising from the back face supporting has a characteristic that the center of gravity thereof little moves. Another one of the characteristics of the touch detection apparatus 1 according to the present embodiment resides in that, utilizing such a characteristic of a wide projected portion arising from the back face supporting as described above, only a wide projected portion arising from the back face supporting can be determined a target of a calibration process to be executed by the touch detection circuit 15. Details of this are hereinafter described with reference to FIGS. 13 and 14.

FIGS. 10A, 10B, 11A, and 11B are views depicting examples of the difference values D(i,j) in the states S5 and S6 depicted in FIG. 3F. The state S5 is a state before the touch detection circuit 15 executes a calibration process, and the state S6 is a state after the touch detection circuit 15 executes the calibration process. In FIGS. 10A, 10B, 11A, and 11B, a projected portion appearing in the proximity of the center of the touch face 5a is an indicator projected portion that reflects a capacitance generated between the finger 8 positioned in the proximity of the center of the touch face 5a and the touch sensor 6. It is to be noted that, although the position of the indicator projected portion differs between FIGS. 10A, 10B, 11A, and 11B, this arises due to the convenience of measurement and is not an essential difference.

Figure 10A:
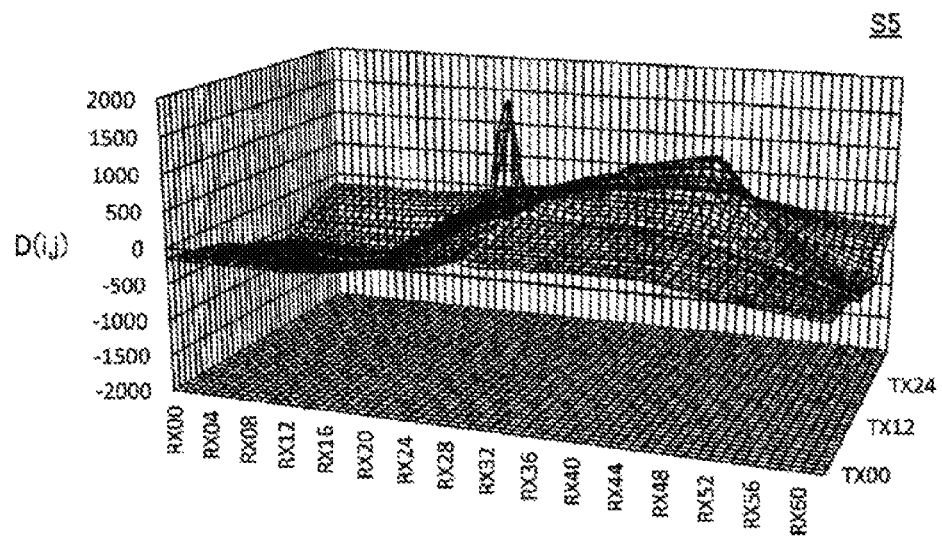
FIGS. 10A and 10B are views depicting an example of the difference value in the state depicted in FIG. 3F (before execution of calibration)
Figure 10B:
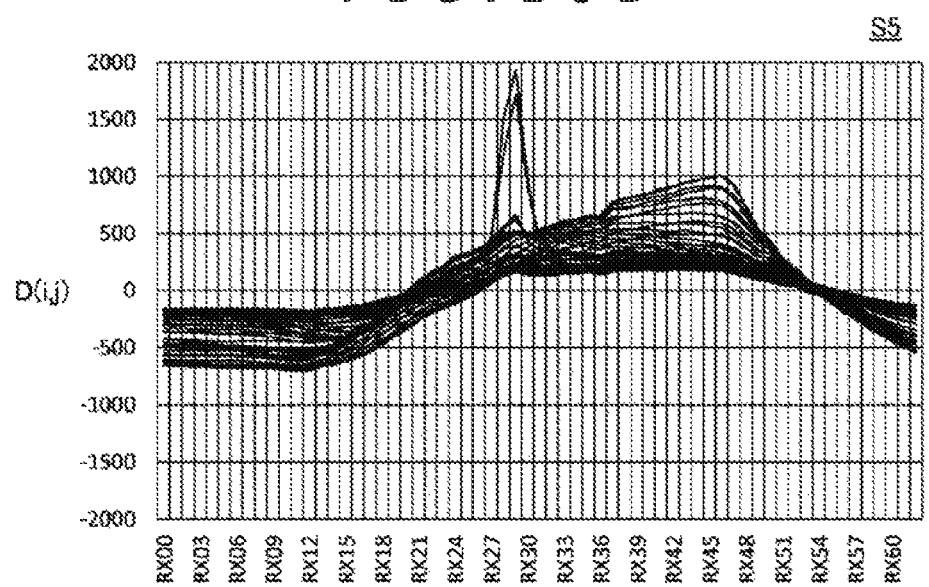
Figure 11A:
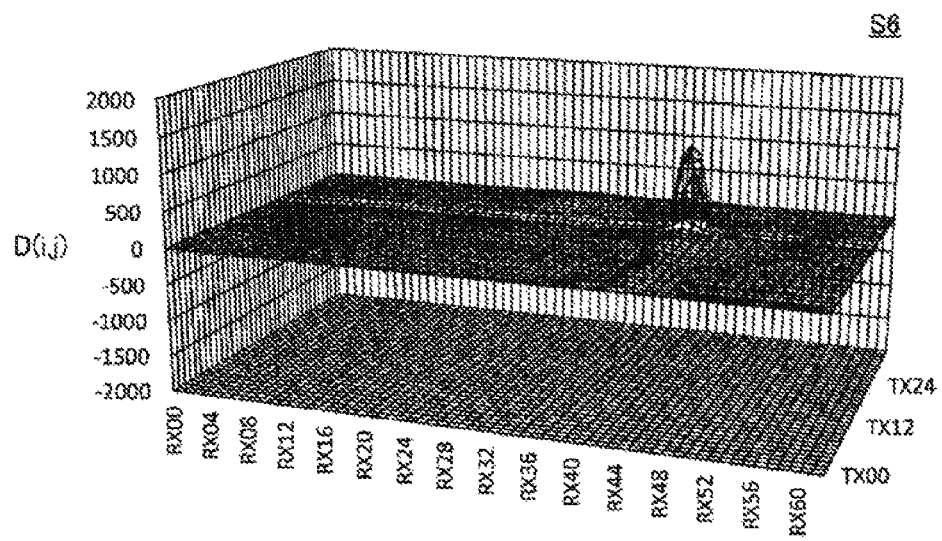
FIGS. 11A and 11B are views depicting an example of the difference value in the state depicted in FIG. 3F (after execution of calibration)
Figure 11B:
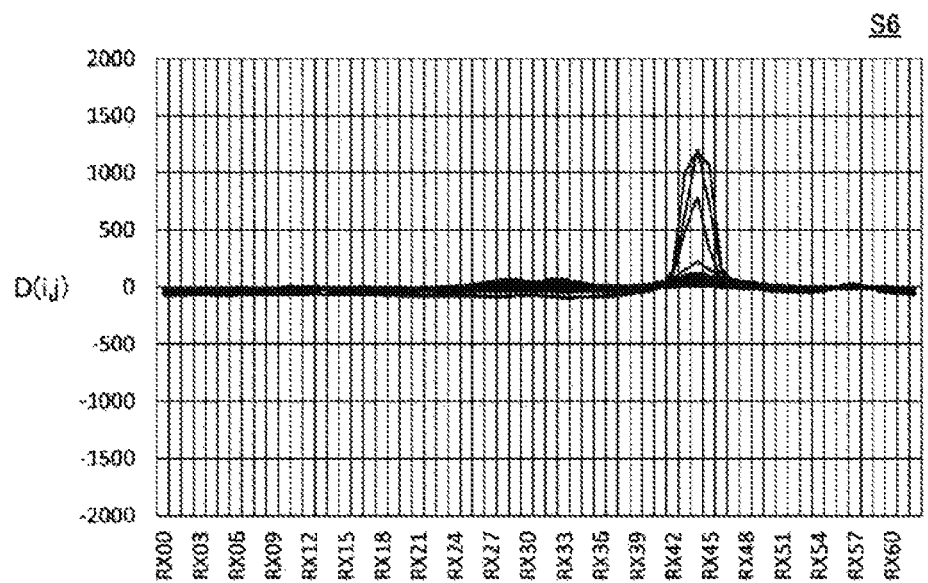

In FIGS. 10A and 10B, a wide projected portion by the back face supporting, which is same as that depicted in FIGS. 9A and 9B, appears around the indicator projected portion. The calibration process performed by the touch detection circuit 15 is for cancelling this wide projected portion, and after execution of the calibration process, the wide projected portion by the back face supporting disappears while only an indicator projected portion appears as depicted in FIGS. 11A and 11B. Also the detailed substance of the calibration process is described hereinafter described with reference to FIGS. 13 and 14.

Particular examples of the difference values D(i,j) stored in the frame memory FM1 depicted in FIG. 2 have been described. Now, functions of the touch detection circuit 15 and the coordinate derivation circuit 16 are described in detail with reference to FIGS. 13 and 14.

Figure 13:
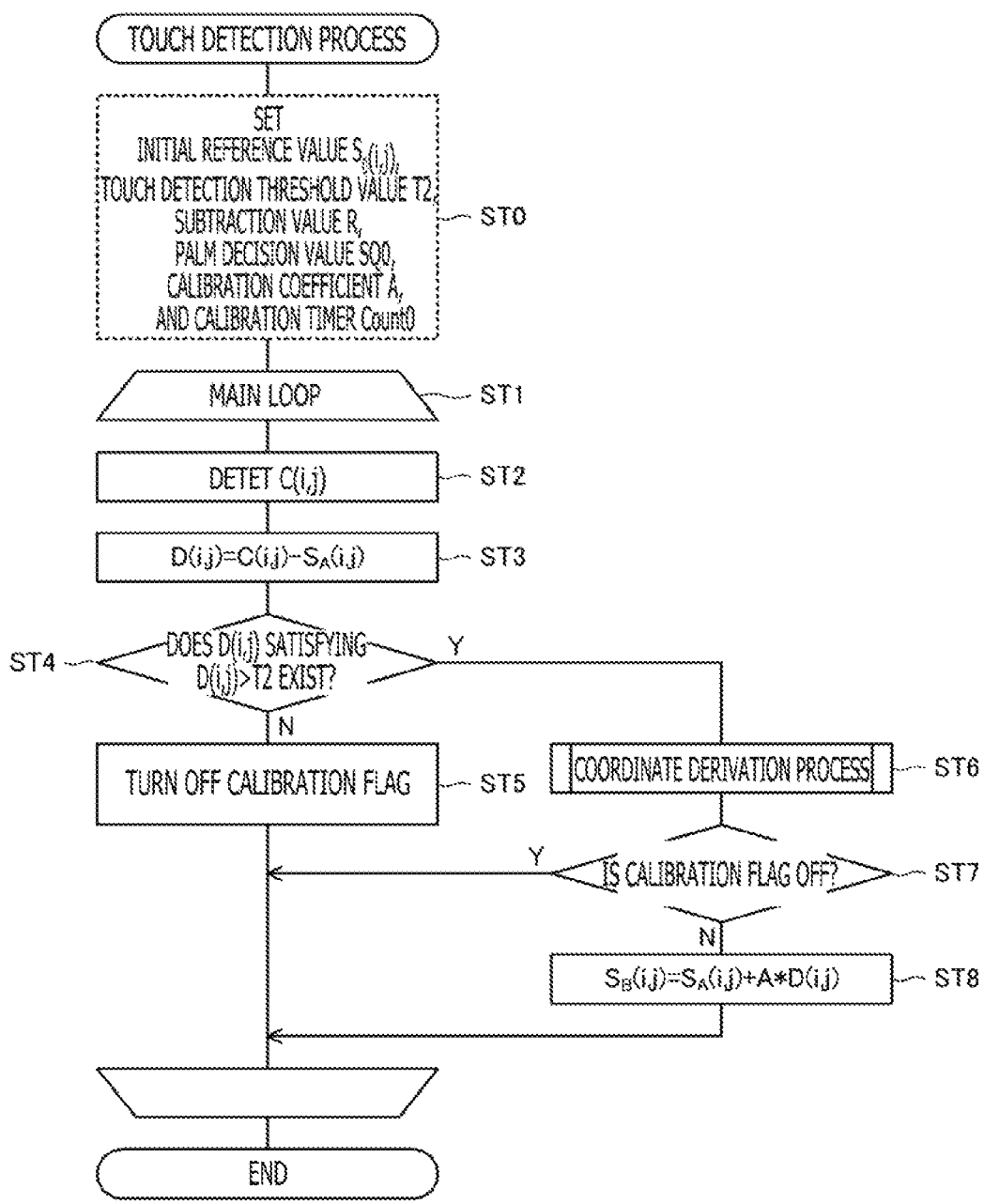
FIG. 13 is a flow chart depicting a processing flow of a touch detection process performed by a touch detection circuit depicted in FIG. 2.

FIG. 13 is a flow chart depicting a processing flow of a touch detection process performed by the touch detection circuit 15. In this touch detection process, various values are set to the touch detection circuit 15 first (ST0). The values set here include an initial reference value $S_0(i,j)$, a touch detection threshold value T2, a subtraction value R, a palm decision value SQ0, a calibration coefficient A, and calibration timer Count0.

Here, actually two frame memories FM0 depicted in FIG. 2 (frame memories for storing reference values S(i,j)) are prepared, and the touch detection circuit 15 is configured such that, every time a main loop hereinafter described is repeated, it selects the two frame memories FM0 alternately and reads out, at ST3 hereinafter described, a reference value S(i,j) from the selected one of the frame memories FM0 and writes, at ST3 hereinafter described, the reference value S(i,j) into the other frame memory FM0. Although, in the following description, such representations as reference value $S_A(i,j)$ and reference value $S_B(i,j)$ are sometimes used, the reference value $S_A(i,j)$ indicates the reference value $S(i,j)$ read out from the selected one of the frame memories FM0 while the reference value $S_B(i,j)$ indicates the reference value $S(i,j)$ written into the other one of the frame memories FM0. The initial reference value $S_0(i,j)$ is an initial value of the reference value $S(i,j)$ and is set to the frame memory FM0 that is selected first. The reference value $S(i,j)$ depicted in FIGS. 5A and 5B is an example of the initial reference value $S_0(i,j)$.

After ST0 ends, the touch detection circuit 15 starts processing of a main loop (ST1). This main loop is repeated until after it is interrupted by an external interrupt such as power off.

In the main loop, the touch detection circuit 15 first refers to a digital signal supplied thereto from the analog to digital converter 14 depicted in FIG. 2 to perform detection of capacitance values $C(i,j)$ (ST2). Then, the touch detection circuit 15 reads out a reference value $S_A(i,j)$ from the frame memory FM0 depicted in FIG. 2 and performs calculation of the expression (1) given hereinabove to calculate a difference value $D(i,j)$ for each crossing position $(i,j)$ (ST3).

Then, the touch detection circuit 15 decides whether or not some of the calculated difference values $D(i,j)$ exceed the touch detection threshold value T2 (ST4). Although this originally is a process for the object of deciding whether or not the calculated difference values $D(i,j)$ include an indicator projected portion, since the touch detection threshold value T2 is usually set to a rather low value, by the process at ST4, not only an indicator projected portion but also such a wide projected portion as depicted in some of FIGS. 6A to 10B is detected.

If a negative decision result is obtained by the process at ST4, then the touch detection circuit 15 turns off the calibration flag (ST5) and then advances the process to a next loop. The calibration flag is hereinafter described.

On the other hand, if an affirmative decision result is obtained by the process at ST4, then the touch detection circuit 15 causes the coordinate derivation circuit 16 to perform a coordinate derivation process (ST6).

Figure 14:
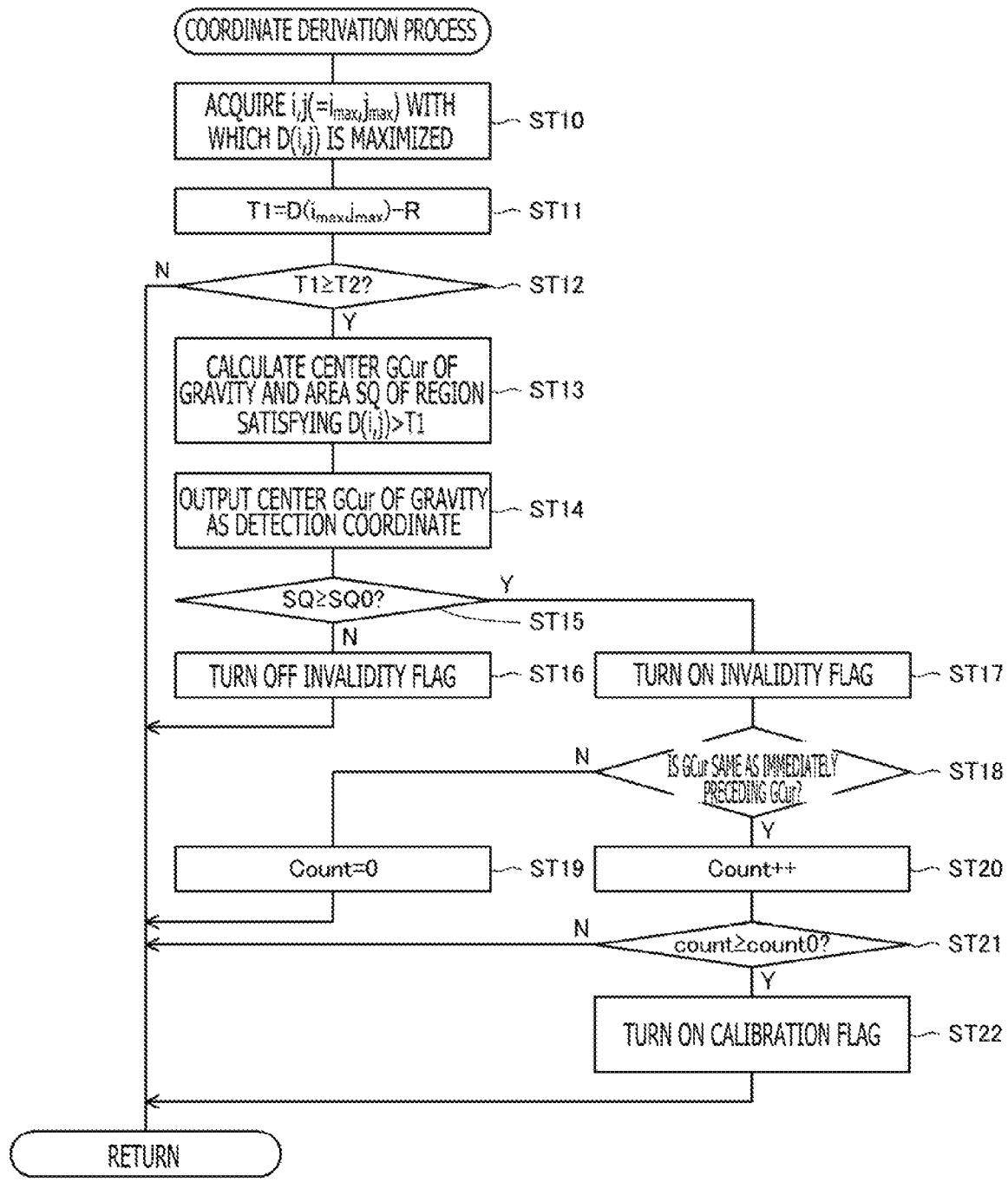
FIG. 14 is a flow chart depicting a processing flow of a coordinate derivation process performed by a coordinate derivation circuit depicted in FIG. 2.

FIG. 14 is a flow chart depicting a processing flow of the coordinate derivation process performed by the coordinate derivation circuit 16. After the process is started, the coordinate derivation circuit 16 first acquires a set $(i_{max}, j_{max})$ of i and j with which the difference value $D(i,j)$ indicates a maximum value (ST10). Then, the coordinate derivation circuit 16 subtracts the subtraction value R from the maximum value $D(i_{max}, j_{max})$ of the difference value $D(i,j)$ in accordance with an expression (2) given below to calculate the touch detection threshold value T1 (ST11).

$$T1 = D(i_{max}, j_{max}) - R \qquad (2)$$

Here, the touch detection threshold value T1 is used to detect only an indicator projected portion with certainty. Accordingly, it is necessary for the subtraction value R to have a value equal to or lower than the height of an indicator projected portion (where a wide projected portion exists, a height from the top of the wide projected portion). In particular, although the subtraction value R may be a fixed value, it is more suitable for the subtraction value R to be a value that decreases as the maximum value $D(i_{max}, j_{max})$ increases.

Figure 15A:
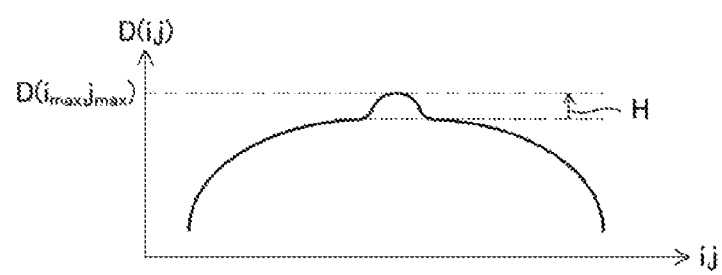
FIGS. 15A and 15B are views depicting a preferred determination method of a subtraction value depicted in FIGS. 13 and 14.
Figure 15B:
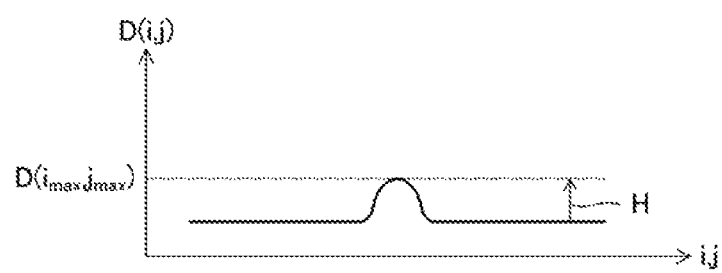

FIGS. 15A and 15B are views illustrating suitable determination methods of the subtraction value R. FIG. 15A depicts a determination method where a wide projected portion exists, and FIG. 15B depicts a determination method where no wide projected portion exists. As depicted in FIGS. 15A and 15B, the maximum value $D(i_{max}, j_{max})$ usually indicates a higher value where a wide projected portion exist than where no wide projected portion exists. On the other hand, the height H of an indicator projected portion usually indicates a higher value where no wide projected portion exists than where a wide projected portion exists. In short, the maximum value $D(i_{max}, j_{max})$ and the height H of an indicator projected portion has a negative correlation. From this, it is considered that the subtraction value R preferably has a value that decreases as the maximum value $D(i_{max}, j_{max})$ increases.

Referring back to FIG. 14, the coordinate derivation circuit 16 having calculated the touch detection threshold value T1 subsequently compares the touch detection threshold value T1 and the touch detection threshold value T2 with each other (ST12). Then, if the touch detection threshold value T1 is lower than the touch detection threshold value T2, then the process is ended, but in any other case, the coordinate derivation circuit 16 advances to a process at ST13.

Figure 16A:
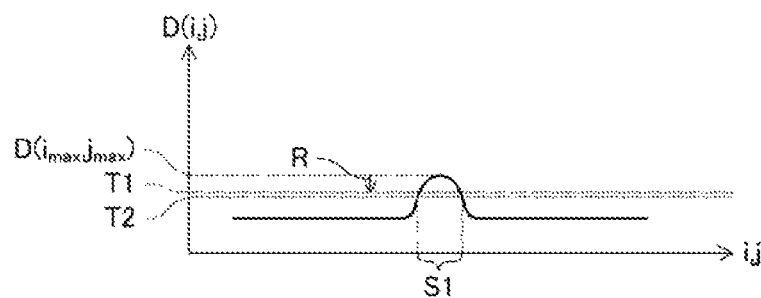
FIGS. 16A to 16C are views illustrating a significance of a depicted in FIG. 14.
Figure 16B:
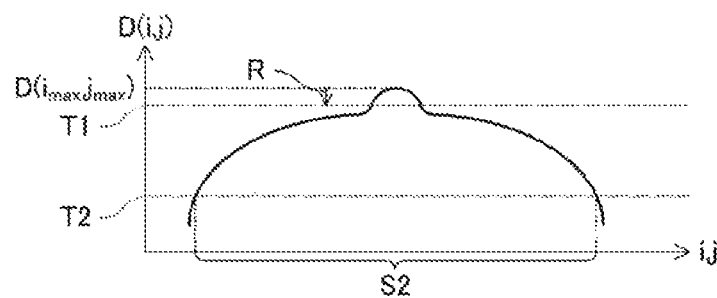
Figure 16C:
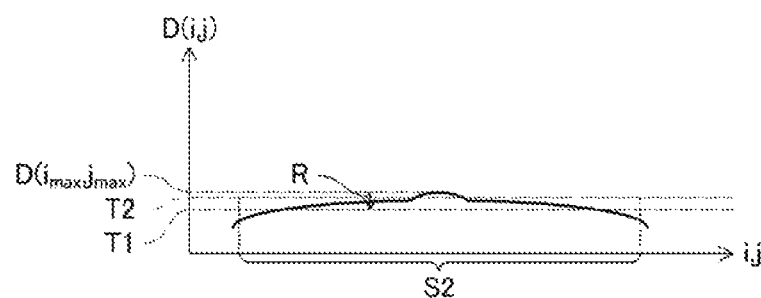

FIGS. 16A to 16C are views illustrating a meaning of ST12. FIG. 16A depicts a case in which, although the finger 8 touches firmly with the touch face 5a, no deflection is generated; FIG. 16B depicts another case in which the finger 8 depresses the touch face 5a strongly and deflection is generated; and FIG. 16C depicts a further case in which the touch by the finger 8 is excessively weak or, although the touch face 5a is not touched, a portion like a projected portion appears from some reason. Where a projected portion appears arising from a touch of the finger 8 as depicted in FIG. 16A or 16B, the touch detection threshold value T1 has a value higher than that of the touch detection threshold value T2. Conversely speaking, the subtraction value R is set such that, even where a wide projected portion does not exist as in the case of FIG. 16A, the touch detection threshold value T1 is higher than the touch detection threshold value T2. On the other hand, if the touch is excessively weak or a portion like a projected portion appears from some reason as depicted in FIG. 16C, usually the touch detection threshold value T1 has a value lower than the touch detection threshold value T2. The process at ST12 in FIG. 14 is a process that causes, in such a case as just described, the position coordinates of the indicator not to be detected (not to be conveyed to the host CPU).

Reference is had back to FIG. 14. At ST13, the coordinate derivation circuit 16 extracts a region or regions in which the difference value $D(i,j)$ is higher than the touch detection threshold value T1 and performs, for each extracted region, a process for calculating the center GCur of gravity and the area SQ. In particular, the coordinate derivation circuit 16 calculates the center GCur of gravity of the region in accordance with an expression (3) given below and determines the number of crossing positions $(i,j)$ included in the region as the area SQ. However, AR in the expression (3) indicates that addition of all crossing positions $(i,j)$ existing in the extracted region or regions is performed.

$$Gcur = \left( \frac{\sum_{AR} (D(i,j) \cdot i)}{\sum_{AR} D(i,j)}, \frac{\sum_{AR} (D(i,j) \cdot j)}{\sum_{AR} D(i,j)} \right) \qquad (3)$$

It is to be noted that, while an example in which the center GCur of gravity is used as a representative position is described here, also it is possible to use some other feature value as the representative position. For example, the center of the region may be used as the representative position, or a point at which the difference value D(i,j) is in the maximum in the region may be used as the representative position. Further, also in regard to the area SQ, although an example in which the number of crossing positions (i,j) included in a region is used as the area SQ is described, also it is possible to geometrically calculate the area of a figure indicated by an outer periphery of a region and use the area as the area SQ.

Then, the coordinate derivation circuit 16 outputs the center GCur of gravity calculated at ST13 as a detected position of an indicator to the host CPU (refer to FIG. 2) (ST14). As can be recognized from the description so far, in the touch detection apparatus 1 according to the present embodiment, the touch detection threshold value T1 configured such that only an indicator projected portion can be detected therewith is used as a threshold value to detect a projected portion and the detected projected portion is outputted as a representative position to the host CPU. Accordingly, with the touch detection apparatus 1 according to the present embodiment, it is implemented to appropriately detect, when an indicator projected portion exists, only the indicator projected portion and perform position detection of an indicator on the basis of the detected indicator projected portion. Further, when a representative position is to be calculated in accordance with the expression (3), only it is necessary to perform the addition process only in a region that corresponds to an indicator projected portion, and therefore, the calculation for coordinate derivation is reduced.

Thereafter, the coordinate derivation circuit 16 decides whether or not the calculated area SQ is equal to or greater than a palm decision value SQ0 (third threshold value) (ST15). In short, this process is a process for deciding whether the detected region is a wide projected portion or an indicator projected portion. An affirmative decision is made at ST15 although the area SQ is calculated utilizing the touch detection threshold value T1 when no indicator projected portion exists in the difference values D(i,j) of the detection target.

If it is decided that the area SQ is not equal to or greater than the palm decision value SQ0, namely, if it is decided that the detected region is an indicator projected portion, then the coordinate derivation circuit 16 turns off an invalidity flag (ST16) and then ends the process. The invalidity flag is a flag that is referred to by the host CPU. The host CPU is configured such that, only when the invalidity flag is off, it deals with the coordinates outputted at ST14 from the coordinate derivation circuit 16 as valid, but discards, when the invalidity flag is on, the coordinates outputted at ST14 from the coordinate derivation circuit 16.

On the other hand, if it is decided that the area SQ is equal to or greater than the palm decision value SQ0, namely, if it is decided that the detected region is a wide projected portion, then the coordinate derivation circuit 16 first turns on the invalidity flag (ST17). Consequently, the coordinates outputted at ST14 from the coordinate derivation circuit 16 are discarded by the host CPU.

After ST17, the coordinate derivation circuit 16 decides whether or not the center GCur of gravity is same as the center GCur of gravity calculated in the immediately preceding loop (ST18). In short, this is a process for confirming presence or absence of some movement of the center GCur of gravity. If it is decided at ST18 that the center GCur of gravity is not same, then the coordinate derivation circuit 16 sets 0 to a variable Count (ST19). In the first loop, the result at ST18 is a negative decision without fail, 0 is set to the variable Count. On the other hand, if it is decided at ST18 that the center GCur of gravity is same, then the coordinate derivation circuit 16 increments the variable Count by one (ST20). Then, the coordinate derivation circuit 16 decides whether or not the variable Count is equal to or higher than the calibration timer Count0 (ST21), and if the variable Count is not equal or higher, then the coordinate derivation circuit 16 ends the process, but if the variable Count is equal or higher, then the coordinate derivation circuit 16 turns on the calibration flag (ST22) and then ends the process.

Reference is had back to FIG. 13. After the touch detection circuit 15 ends the coordinate derivation process by the coordinate derivation circuit 16 (ST6), it decides whether or not the calibration flag is off (ST7). Then, if it is decided that the calibration flag is off, then the process advances to a next loop. On the other hand, if it is decided that the calibration flag is on, then the touch detection circuit 15 updates the reference value S(i,j) stored in the frame memory FM0 depicted in FIG. 2 in accordance with an expression (4) given below (ST8), whereafter the process advances to a next loop.

$$S_B(i,j)=S_A(i,j)+A \cdot D(i,j) \quad (4)$$

The expression (4) signifies that the reference value S(i,j) is increased by an amount equal to the difference value D(i,j) multiplied by the calibration coefficient A. It is to be noted that the calibration coefficient A is a constant that satisfies 0<A<1. If the process advances to a next loop through the expression (4), then at ST3 in the next loop, at a location at which the difference value D(i,j) of a higher value is detected in the preceding loop, a value higher than that in the immediately preceding loop is subtracted from the capacitance C(i,j). This signifies that updating of the reference value S(i,j) based on the expression (4) has a calibration effect of canceling a projected portion appearing among the difference values D(i,j). Further, since the process at ST15 (process for confirming whether or not the area SQ of the detected region is equal to or greater than the palm decision value SQ0) and the process at ST18 (process for confirming whether or not the center GCur of gravity has moved) are provided, the calibration process is executed only when a wide projected portion by the back face supporting appears. Accordingly, with the touch detection apparatus 1 according to the present embodiment, it is implemented that only a wide projected portion caused by the back face supporting is made a target of calibration.

Figure 17:
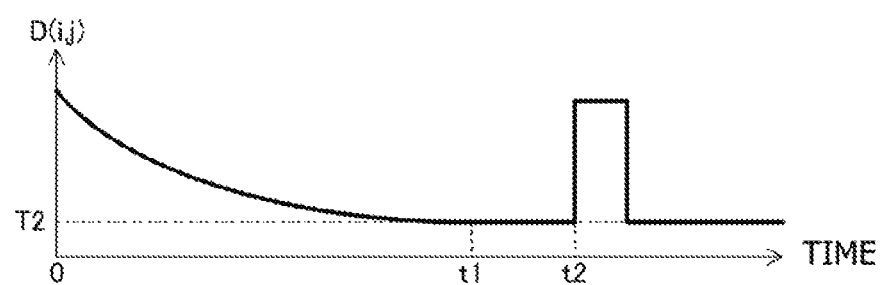
FIG. 17 is a view depicting an effect of calibration performed by the touch detection circuit depicted in FIG. 2.

FIG. 17 is a view depicting an effect of calibration performed by the touch detection circuit 15. In FIG. 17, a time variation of the difference value D(i,j) at a crossing position (i,j) at which a projected portion arising from the back face supporting when the state S4 (in the back face supporting state) depicted in FIG. 3E continues is schematically depicted. Since the state S4 continues, if it is assumed that calibration is not performed, then the difference value D(i,j) continues to have a high value. However, since calibration is executed, the difference value D(i,j) drops to the level of the touch detection threshold value T2 before time t1. More particularly describing, at a stage before calibration is performed, the touch detection threshold value T1 has a value higher than the touch detection threshold value T2. This is because the reference value S(i,j) is low. As a result, the result of the decision at ST12 of FIG. 14 becomes an affirmative result, and calibration is executed. As the calibration proceeds, the touch detection threshold value T1 gradually decreases, and at time t1 depicted in FIG. 17, the touch detection threshold value T1 becomes lower than the touch detection threshold value T2. Thereafter, since the result of the decision at ST12 in FIG. 14 is a negative result, calibration is not performed any more. Simultaneously, since also calculation of the center GCur of gravity and the area SQ at ST13 is not performed any more, the calculation process of the touch detection apparatus 1 is reduced thereafter.

In FIG. 17, also a time variation of the difference value D(i,j) when the state S6 depicted in FIG. 3E (state in which the touch face 5a is touched by the finger 8 while the back face supporting continues) is entered at time t2 after then is depicted. After the calibration is stopped, while an indicator does not exist in the proximity of the touch face 5a, the difference value D(i,j) does not become higher than the touch detection threshold value T2, and therefore, the result of the decision at ST4 of FIG. 13 is a negative decision and the coordinate derivation process of FIG. 14 is not performed. If an indicator comes close to the touch face 5a at time t2, then since the result of the decision at ST4 in FIG. 13 changes to an affirmative decision, the coordinate calculation process of FIG. 14 is performed. In this coordinate derivation process, the touch detection threshold value T1 is lower than the touch detection threshold value T2, and therefore, the result of the decision at ST12 is an affirmative decision and coordinate outputting to the host CPU is executed.

As described above, with the touch detection apparatus 1 according to the present embodiment, since, after a maximum value among the difference value D(i,j) is detected, the subtraction value R is subtracted from the maximum value to calculate the touch detection threshold value T1 that is used as a reference for position derivation, even if a wide projected portion is caused by deflection or a touch by a fist, only an indicator projected portion can be detected appropriately.

Further, with the touch detection apparatus 1 according to the present embodiment, since calibration is activated only when a representative position does not move, it is possible to make only a wide projected portion arising from the back face supporting as a target of calibration.

With the touch detection apparatus 1 according to the present embodiment, also an effect that the calculation process of the touch detection apparatus 1 can be reduced is obtained further. In particular, if it is assumed otherwise that calibration according to the present embodiment is not performed, then while the user performs the back face supporting, a wide projected portion arising from the back face supporting continues to appear in the difference values D(i,j), and the calculation process for coordinate derivation (ST13) continues to be performed in regard to the wide projected portion. However, even if coordinates of the wide projected portion are derived, since the coordinates are finally invalidated by the invalidity flag set at ST16, the coordinate derivation performed at ST13 in this case is a process that need not originally be performed, and to the host CPU, notification itself of information to which the invalidity flag is added is unnecessary. With the touch detection apparatus 1 according to the present embodiment, as a result of carrying out of calibration, a wide projected portion arising from the back face supporting does not appear any more in the difference values D(i,j) at time t1 of FIG. 17 and a negative decision is made at ST4. Therefore, such a situation that a calculation process that need not originally be performed is performed as described above is eliminated. Accordingly, the calculation process of the touch detection apparatus 1 can be reduced.

It is to be noted that such a reduction effect of the calculation process is sometimes exhibited also in a case in which the back face supporting is not performed. For example, also when canned juice is placed on the touch face, a wide projected portion whose center of gravity does not move is obtained, and accordingly, a calculation process reduction effect similar to that described above is achieved. Further, also in such a case that a water drop exists on the touch face or static electricity is accumulated at part of the touch face and this sustainably increases the capacitance at the portion, since a wide projected portion whose center of gravity does not move is obtained, a reduction effect of the calculation process in the touch detection apparatus 1 can be achieved.

Although the preferred embodiment of the present disclosure has been described, the present disclosure is not at all limited to such an embodiment as described above, and it is a matter of course that the present disclosure can be carried out in various modes without departing from the subject matter thereof.

For example, although, in the embodiment described above, calculation of the center GCur of gravity and the area SQ is carried out on the basis of the difference value D(i,j) (s ST11 and ST13 of FIG. 14), also it is possible to calculate them on the basis of a value of a different type if it is a value (detection value) corresponding to a capacitance between an indicator and the touch sensor 6. As an example, also it is possible to use the capacitance C(i,j) described hereinabove as a detection value, and also it is possible to detect some other value as a detection value. In the following, an example is described.

Figure 18:
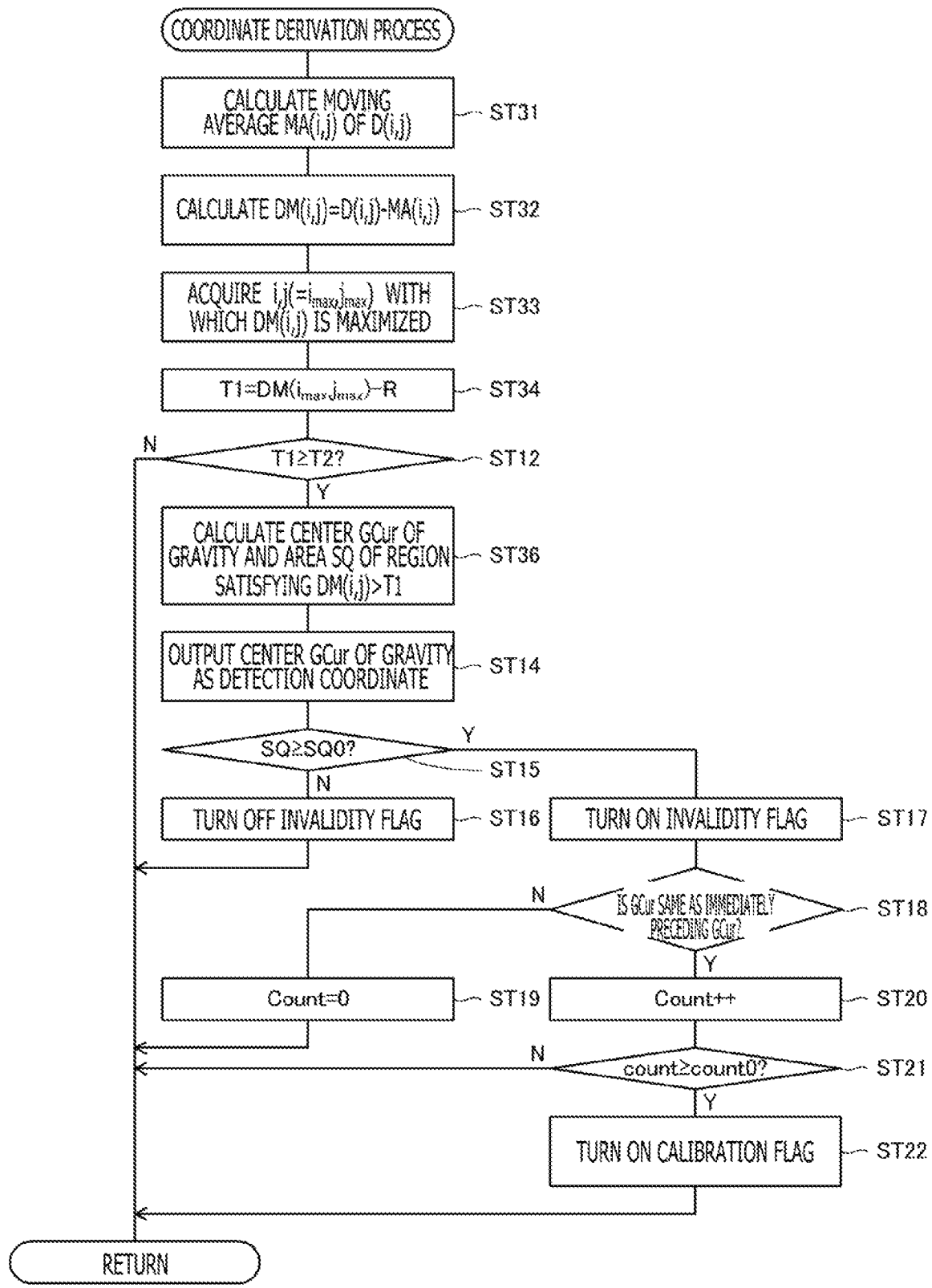
FIG. 18 is a flow chart depicting a modification to the coordinate derivation process depicted in FIG. 14.
Figure 19:
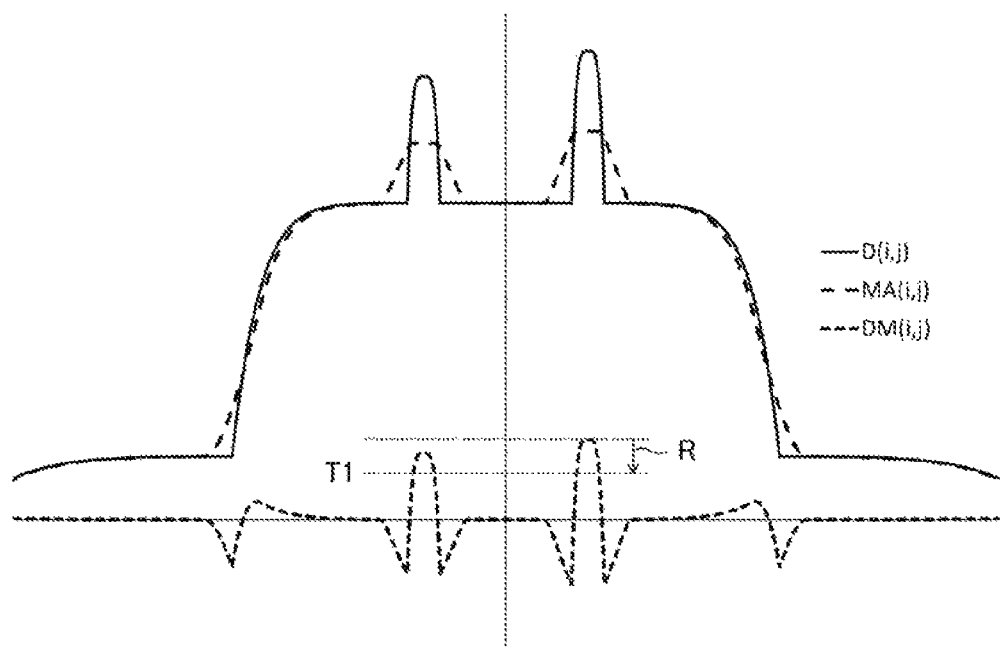
FIG. 19 is a view depicting an example of a moving average and a difference value depicted in FIG. 14.

FIG. 18 is a block diagram depicting a modification to the coordinate derivation process depicted in FIG. 14. In this modification, a subtraction value DM(i,j) calculated on the basis of a moving average MA(i,j) of difference values D(i,j) is used as the detection value. In FIG. 19, a particular example of such values is illustrated. Describing particularly with reference to FIG. 18, the coordinate derivation circuit 16 first calculates a moving average MA(i,j) of difference values D(i,j) read out from the frame memory FM1 (refer to FIG. 2) (ST31). This calculation is suitably performed by calculating, for each crossing position (i,j), an average of a difference value D(i,j) corresponding to the crossing position (i,j) and a difference value or values of one or a plurality of different crossing positions neighboring with the crossing position (i,j) as indicated by an expression (5) given below. It is to be noted that both k and m in the expression (5) are natural numbers and generally it is preferable to set them to k=m=1.

$$MA(i, j) = \frac{\sum_{x=i-k}^{i+k} \sum_{y=j-m}^{j+m} D(x, y)}{(2k+1)(2m+1)} \quad (5)$$

Then, the coordinate derivation circuit 16 subtracts, for each crossing position (i,j), the moving average MA(i,j) from the difference value D(i,j) in accordance with an expression (6) given below to calculate a subtraction value DM(i,j) (ST32). As depicted in FIG. 19, the subtraction values DM(i,j) calculated in this manner are generally equivalent to the difference values D(i,j) from which a wide projected portion is removed. Thereafter, processes similar to those depicted in FIG. 14 are performed except that the subtraction value DM(i,j) is used in place of the difference value D(i,j) (s beginning with ST33).

$$DM(i,j)=D(i,j)-MA(i,j) \quad (6)$$

With the present modification, in addition to that similar effects to those of the embodiment described above are obtained, since a wide projected portion is almost removed from the subtraction values DM(i,j) and an indicator projected portion is emphasized, when a plurality of indicator projected portions exist as depicted in FIG. 19, they can be detected with a higher degree of certainty.

Further, while, in the embodiment described hereinabove, the difference values D(i,j) calculated at ST3 of FIG. 13 are used as they are in succeeding processes, since, where the reference value S(i,j) is made higher by the calibration process, the difference value D(i,j) becomes low, raising of the difference value D(i,j) may be performed. In the following, this is described particularly.

Figure 20:
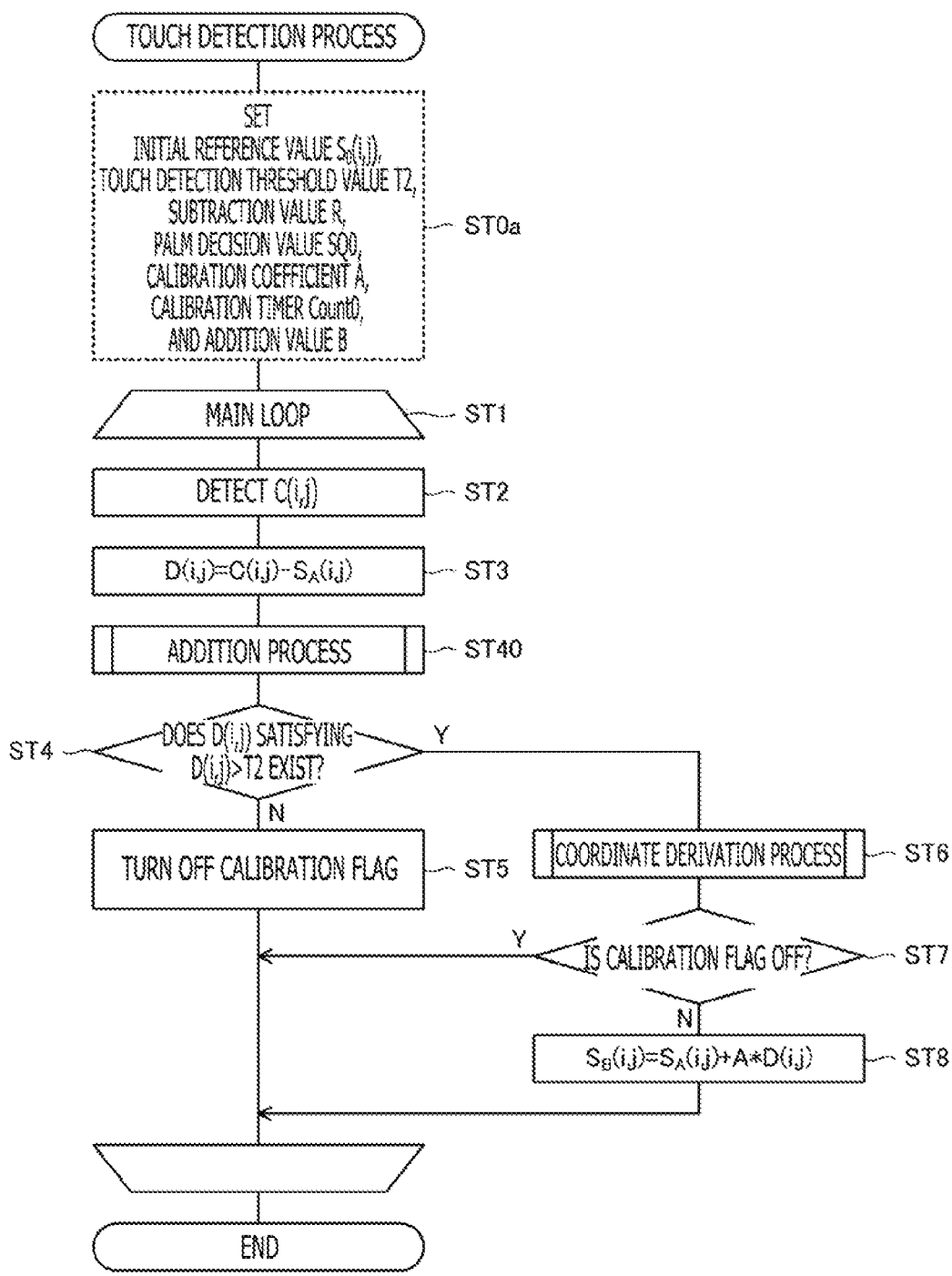
FIG. 20 is a flow chart depicting a modification to the touch detection process depicted in FIG. 13.

FIG. 20 is a flow chart depicting a modification to the touch detection process depicted in FIG. 13. As depicted in FIG. 20, in this modification, an addition process (ST40) is interposed between ST3 and ST4. Further, as one of values to be set first, an addition value B that is used in the addition process is added (ST0a).

Figure 21:
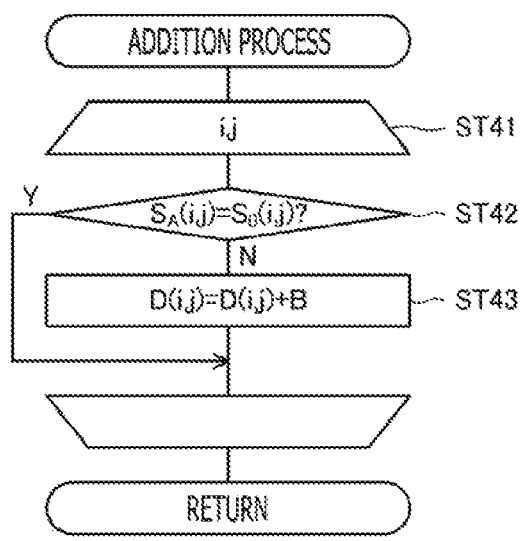
FIG. 21 is a flow chart depicting a processing flow of an addition process depicted in FIG. 20.

FIG. 21 is a flow chart depicting a processing flow of the addition process. As depicted in FIG. 21, in this addition process, the touch detection circuit 15 carries out a process of performing comparison between the latest reference value S(i,j) and the initial reference value $S_0(i,j)$ set at ST0a (S42) and adding, if they do not coincide with each other, the addition value B to the difference value D(i,j) calculated at ST3 (ST43) for all crossing positions (i,j) (S41). It is to be noted that, in order to perform the comparison at ST42, it is necessary to store the initial reference value $S_0(i,j)$ into a frame memory different from the two frame memory FM0 described hereinabove. That the latest reference value S(i,j) and the initial reference value $S_0(i,j)$ do not coincide with each other signifies that the crossing position (i,j) is a target of calibration, and therefore, according to the process of FIG. 21, it is possible to perform raising of the difference value D(i,j) by the addition value B only for the crossing position (i,j) that is a target of the calibration.

Figures 22A, 22B, 22C:
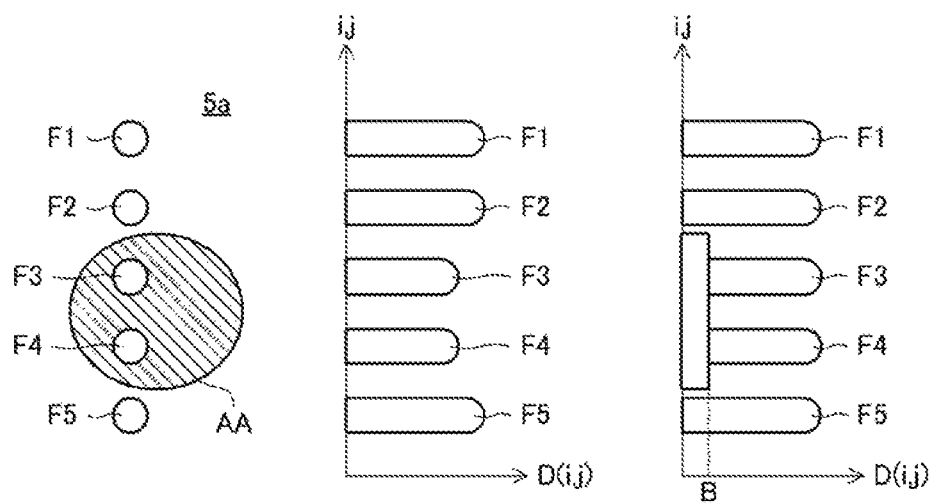
FIGS. 22A to 22C are views illustrating an effect of the modification depicted in FIG. 20.

FIGS. 22A to 22C are views illustrating an effect of the present modification. FIG. 22A schematically depicts a state in which, in a state in which an occurrence region AA of a wide projected portion arising from the back face supporting is present in the touch face 5a, five fingers F1 to F5 touch simultaneously with the touch face 5a. Meanwhile, FIG. 22B schematically depicts a difference value D(i,j) calculated at ST3 at the time, and FIG. 22C schematically depicts a difference value D(i,j) after ST40 is performed further. It is to be noted that, in FIGS. 22A to 22C, a state is depicted in which calibration has been executed sufficiently already and a wide projected portion caused by the back face supporting does not appear in the difference values D(i,j) anymore.

As depicted in FIG. 22B, indicator projected portions corresponding to the fingers F3 and F4 touching with the occurrence region AA are small in comparison with indictor projected portions corresponding to the fingers F1, F2, and F5 touching with portions other than the occurrence region AA. This is because, as a result of execution of calibration, the reference values S(i,j) have become higher in the occurrence region AA. By carrying out the addition process depicted in FIG. 21, the difference values D(i,j) in the occurrence region AA are raised by an amount corresponding to the addition value B as depicted in FIG. 22C. As a result, the indicator projected portions corresponding to the fingers F3 and F4 are raised to a level similar to that of the indicator projected portions corresponding to the fingers F1, F2, and F5. In this manner, with the present modification, also in a region in which the reference value S(i,j) is made higher by a calibration process, a high indicator projected portion can be obtained similarly as in a region in which the reference value S(i,j) is not made higher.

Further, in the embodiment described above, in a case in which none of the difference values D(i,j) calculated at ST3 of FIG. 13 exceeds the touch detection threshold value T2 (negative decision at ST4), in another case in which the area SQ calculated at ST13 of FIG. 14 is lower than the palm decision value SQ0 (negative decision at ST15), in a further case in which the center GCur of gravity calculated at ST13 of FIG. 14 is not equal to the center GCur of gravity calculated in the immediately preceding loop (negative decision at ST18) and in a still further case in which the variable Count is smaller than the calibration timer Count0 (negative decision at ST21), calibration is not performed. However, in those cases, calibration may be performed. This is described particularly below.

Figure 23:
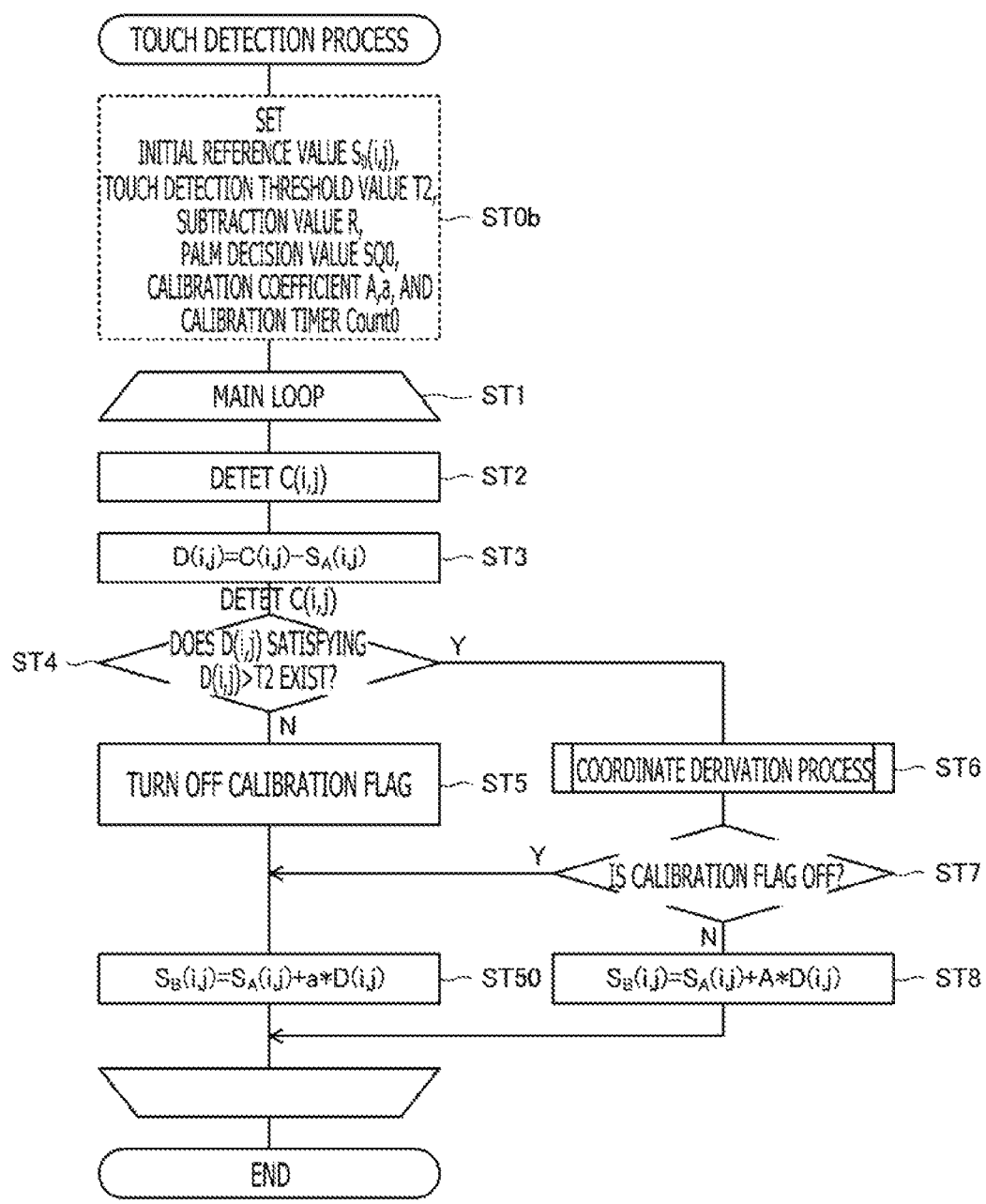
FIG. 23 is a flow chart depicting a different modification to the touch detection process depicted in FIG. 13.

FIG. 23 is a flow chart depicting a different modification to the touch detection process depicted in FIG. 13. As depicted in FIG. 23, a calibration process (ST50) is inserted also to a next stage to ST5. Further, as one of values to be set first, a calibration coefficient a to be used in the calibration process is added (ST0b).

In the calibration process at ST50, reference values S(i,j) stored in the frame memory FM0 depicted in FIG. 2 are updated in accordance with an expression (7) given below. In this case, the calibration coefficient a is preferably set to a value lower than the calibration coefficient A to be used at ST8. By this, in the calibration at ST8, the reference value S(i,j) approaches the difference value D(i,j) rapidly in comparison with that in the calibration at ST50. In short, when a wide projected portion caused by the back face supporting is detected, the wide projected portion can be canceled rapidly in comparison with that in any other case.

$$S_B(i,j) = S_A(i,j) + \alpha \cdot D(i,j) \tag{7}$$

Figure 24:
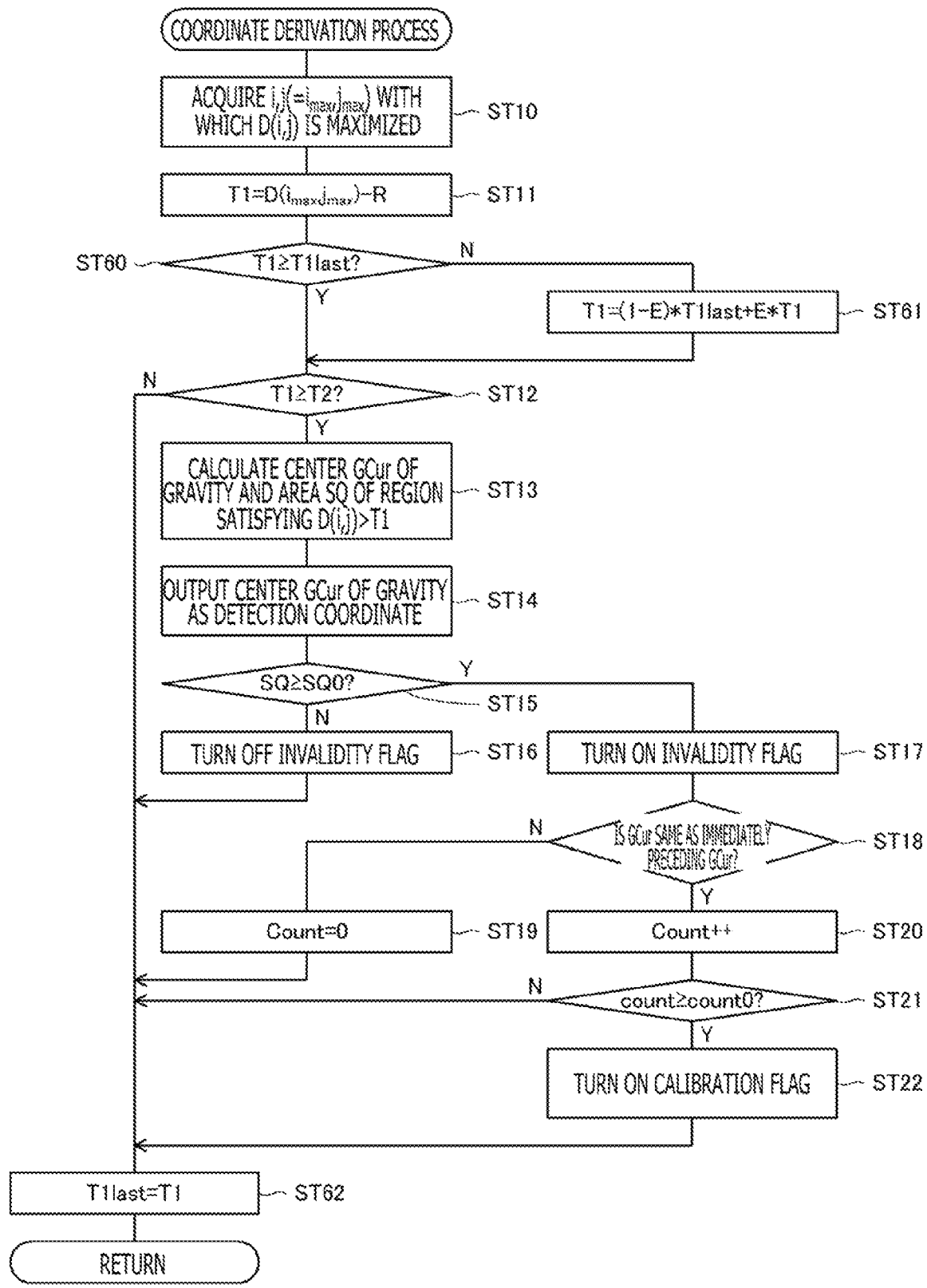
FIG. 24 is a view depicting a different modification to the coordinate derivation process depicted in FIG. 14.

FIG. 24 is a flow chart depicting another modification to the coordinate derivation process depicted in FIG. 14. As depicted in FIG. 24, in this modification, a process (ST60) for deciding whether or not the touch detection threshold value T1 is equal to or higher than a variable T1 last and a process (ST61) for re-setting the touch detection threshold value T1 when a negative decision result is obtained at ST60 are inserted between ST11 and ST12. Further, at the last stage of the coordinate derivation process, a process for setting the touch detection threshold value T1 to the variable T1 last is inserted (ST62).

The re-setting of the touch detection threshold value T1 at ST61 is a process for re-setting a value higher than a value set at ST11 to the touch detection threshold value T1 and particularly is carried out by re-setting a value obtained by adding (1-E) times the variable T1 last to E times the touch detection threshold value T1 to the touch detection threshold value T1 as indicated by an expression (8) given below. However, E is a constant (updating coefficient) that satisfies 0<E<1 and is initially set together with the other values at ST0 depicted in FIG. 13. In a scene in which ST61 is executed, the touch detection threshold value T1 calculated at ST11 is lower than the variable T1 last without fail, and therefore, the touch detection threshold value T1 calculated in accordance with the expression (8) is a value higher without fail than the value set at ST11.

$$T1 = (1-E) \cdot T1\text{ last} + E \cdot T1 \tag{8}$$

Figure 25A:
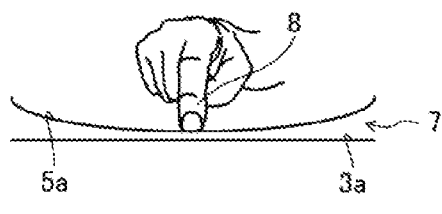
FIGS. 25A to 25H are views illustrating an effect of the modification depicted in FIG. 24.
Figure 25B:
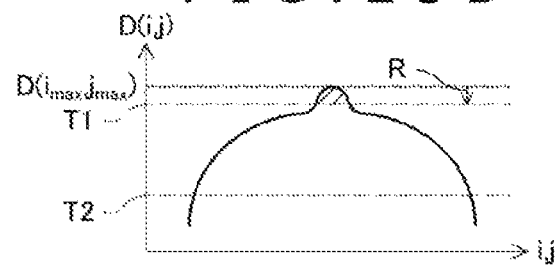
Figure 25C:
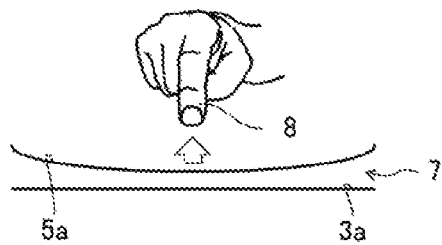
Figure 25D:
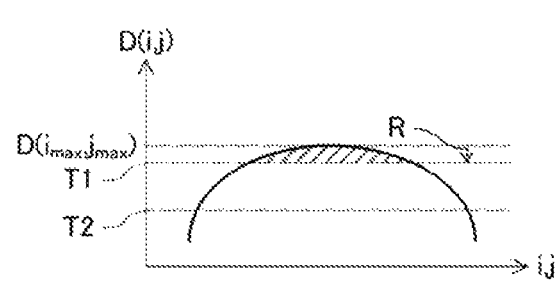
Figure 25E:
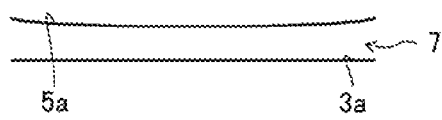
Figure 25F:
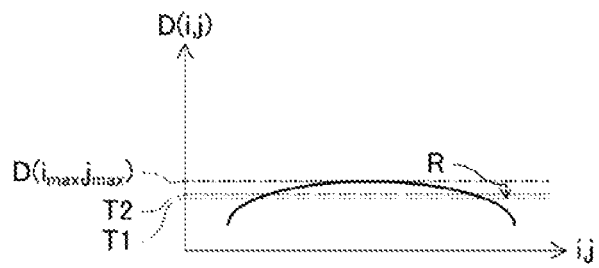
Figure 25G:
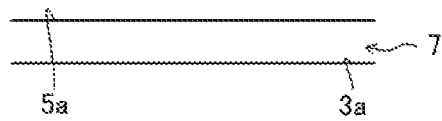
Figure 25H:
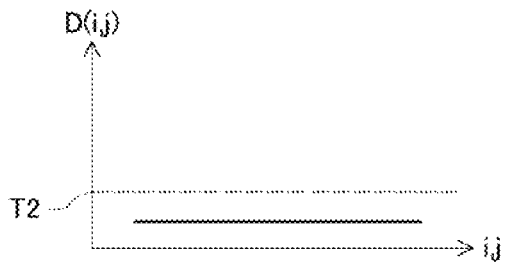
Figure 26A:
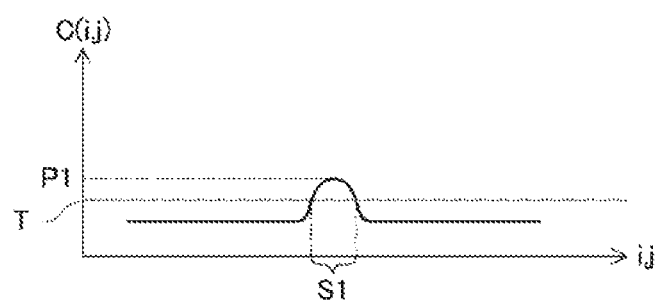
FIGS. 26A and 26B are views depicting an example of a capacitance according to the background art of the present disclosure.
Figure 26B:
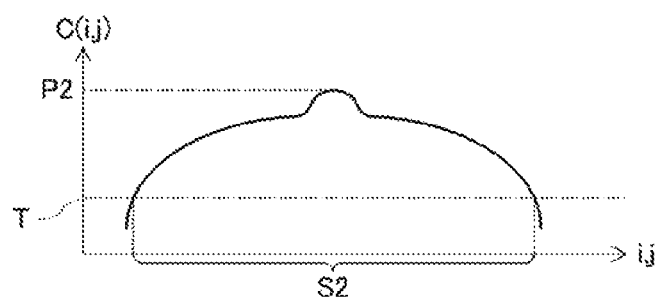

FIGS. 25A to 25H are views illustrating an effect of the present modification. FIGS. 25A, 25C, 25E, and 25G are sectional views illustrating a manner in which, after the touch face 5a is depressed by the finger 8, deflection of the touch face 5a is gradually eliminated, and FIG. 25A depicts a state in which the touch face 5a is depressed by the finger 8; FIG. 25C depicts a state in which the deflection of the touch face 5a continues even after the finger 8 is spaced away from the touch face 5a; FIG. 25E depicts a state in which the deflection still remains while it is being eliminated; and FIG. 25G depicts a state in which the deflection is eliminated fully. Meanwhile, FIGS. 25B, 25D, 25F, and 25H depict states of the difference value D(i,j) corresponding to FIGS. 25A, 25C, 25E, and 25G, respectively, and the touch detection threshold value T1 depicted in FIGS. 25B, 25D, 25F, and 25H indicate values calculated at ST11 of FIG. 24 (values before re-setting by ST61).

As depicted in FIGS. 25A to 25H, the "deflection" caused by depression of the touch face 5a by the finger 8 has a hysteresis, and even after the finger 8 is spaced away from the touch face 5a, the deflection is not eliminated immediately but is eliminated gradually. Along with this, the touch detection threshold value T1 gradually decreases, and at a stage at which the touch detection threshold value T1 becomes lower than the touch detection threshold value T2 as depicted in FIG. 25D, the decision result at ST12 changes to a negative decision and the execution of the process for outputting detection coordinates to the host CPU (ST14) is stopped.

Conversely speaking, for a period of time until the touch detection threshold value T1 becomes lower than the touch detection threshold value T2, detection coordinates continue to be outputted to the host CPU although the indicator projected portion does not exist. Since the detection coordinates outputted in this manner merely indicate the center of gravity of a region indicated by slanting lines in FIG. 25D, namely, of an upper end portion of a wide projected portion caused by "deflection" and do not indicate the position of the indicator, as viewed from the host CPU, they are a result of detection in error.

In the present modification, since the processes at s ST60, ST61, and ST62 are added, decrease of the touch detection threshold value T1 is delayed in a scene in which the touch detection threshold value T1 gradually decreases as exemplified in FIGS. 25A to 25H. As a result, in such a scene as depicted in FIG. 25D, the touch detection threshold value T1 is higher than the maximum value $D(i_{max}, j_{max})$ and the "region that satisfies D(i,j)>T1" is no more detected at ST13. Therefore, such a situation that detection coordinates that are nothing but the center of gravity of an upper end portion of a wide projected portion are outputted to the host CPU as described above can be prevented. Accordingly, with the present modification, detection in error of the position of an indicator caused by a hysteresis of "deflection" is prevented.

It is to be noted that, although a particular value of the constant E is preferably determined experimentally such that the effect described above can be obtained, it is preferable to set the constant E, for example, such a values as 0.1 or 0.5.

Besides them, various modifications to the touch detection apparatus 1 according to the present embodiment are available. For example, while, in the embodiment described above, it is decided whether or not the center GCur of gravity calculated newly and the immediately preceding center GCur of gravity are fully coincident with each other (ST18 of FIG. 14) and a calibration process is activated when a state in which the result of the decision is coincidence continues for a period of time indicated by the calibration timer Count0, this process is an example, and the calibration process may be activated when the center GCur of gravity does not move exceeding a predetermined range within a predetermined period of time. Giving a particular example, it may be decided that, for example, the center GCur of gravity calculated newly is included in a predetermined range centered at the immediately preceding center GCur of gravity. The predetermined range in this case is preferably set, for example, to a range of a circle of a diameter of 5 mm or of a rectangle of a 5 mm square centered at the immediately preceding center GCur of gravity in an actual size on the touch face 5a, more preferably to a range of the inside of a circle of a diameter of 1.5 mm or of a rectangle of a 1.5 mm square centered at the immediately preceding center GCur of gravity in an actual size on the touch face 5a.

Further, although the present disclosure is specifically effective to a touch detection apparatus of the air gap type, it can be applied also to a touch detection apparatus of a type other than the air gap type. Accordingly, the present disclosure can be utilized universally including also such a case that a mounting environment of the touch sensor is unknown in advance.

Further, although the embodiment described above is described such that maximum values, detection values and so forth assume positive values, also it is possible to describe such that they assume negative values, and in such a case, it is a matter of course that the relationship in magnitude between different values is reverse to that described hereinabove. To detect a maximum value is to detect a maximum value when a variation in capacitance by approaching of a finger is detected as a positive value, and in such a case that a variation in capacitance by approaching of a finger is represented in a negative value as a decreasing amount of detected current, to detect a maximum value corresponds to detect a minimum value.

It is to be noted that the embodiment of the present disclosure is not limited to the foregoing embodiments, and that various changes can be made without departing from the spirit of the present disclosure.

What is claimed is:
1. A touch detection method performed by a controller of a touch sensor of a capacitive type that is disposed over a display device and spaced apart from the display device by an air gap between the touch sensor and the display device, the touch sensor being deflectable toward the display device and including a plurality of sensor electrodes, the touch detection method comprising:
   acquiring a plurality of detection values at a plurality of crossing positions of the sensor electrodes, each of the detection values corresponding to a capacitance between an indicator and the touch sensor at one of the crossing positions;
   acquiring a plurality of difference values for the crossing positions, wherein the difference values for the crossing positions are the detection values at the crossing positions minus a plurality of reference values for the crossing positions, and each of the reference values corresponds to a different one of the crossing positions;
   acquiring a maximum value among the difference values for the crossing positions;
   determining a first threshold value by subtracting a subtraction value, which is a fixed value or a value that decreases as the maximum value increases, from the maximum value among the difference values for the crossing positions;
   determining whether the first threshold value is greater than or equal to a second threshold value; and in response to determining that the first threshold value is greater than or equal to the second threshold value, deriving a position of the indicator based on the detection values at the crossing positions with reference to the first threshold value, wherein the position of the indicator is not derived based on the detection values at the crossing positions if the first threshold value is not determined to be greater than or equal to the second threshold value.

2. The touch detection method according to claim 1, further comprising:
acquiring the plurality of reference values for the crossing positions, each of the reference values corresponding to one of the crossing positions;
acquiring a plurality of capacitance values for the crossing positions, each of the capacitance values indicative of a capacitance at one of the crossing positions; and
for each crossing position of the crossing positions, subtracting one of the reference values for the crossing position from one of the capacitance values for the crossing position.

3. The touch detection method according to claim 1, wherein:
the first threshold value is higher than the second threshold value in a case where the touch sensor is not deflected toward the display device and a projected portion indicated by the difference values has a first width,
the first threshold value is higher than the second threshold value in a case where the touch sensor is deflected toward the display device and the projected portion indicated by the difference values has a second width that is wider than the first width, and
the first threshold value is lower than the second threshold value in a case where the touch sensor is not deflected toward the display device and the projected portion indicated by the difference values has the second width that is wider than the first width.

4. A touch detection apparatus comprising:
a touch sensor of a capacitive type that is disposed over a display device and spaced apart from the display device by an air gap between the touch sensor and the display device, the touch sensor being deflectable toward the display device and including a plurality of sensor electrodes;
a touch detection circuit which, in operation, acquires a plurality of detection values for a plurality of crossing positions of the sensor electrodes, each of the detection values corresponding to a capacitance between an indicator and the touch sensor at one of the crossing positions, and acquires a plurality of difference values for the crossing positions, wherein the difference values for the crossing positions are the detection values at the crossing positions minus a plurality of reference values for the crossing positions, and each of the reference values corresponds to a different one of the crossing positions; and
a coordinate derivation circuit which, in operation,
acquires a maximum value among the difference values for the crossing positions,
determines a first threshold value by subtracting a subtraction value, which is a fixed value or a value that decreases as the maximum value increases, from the maximum value among the difference values for the crossing positions,
determines whether the first threshold value is greater than or equal to a second threshold value, and
in response to determining that the first threshold value is greater than or equal to the second threshold value, derives a position of the indicator based on the detection values for the crossing positions with reference to the first threshold value, wherein the position of the indicator is not derived based on the detection values at the crossing positions if the first threshold value is not determined to be greater than or equal to the second threshold value.

5. The touch detection apparatus according to claim 4, wherein:
the first threshold value is higher than the second threshold value in a case where the touch sensor is not deflected toward the display device and a projected portion indicated by the difference values has a first width,
the first threshold value is higher than the second threshold value in a case where the touch sensor is deflected toward the display device and the projected portion indicated by the difference values has a second width that is wider than the first width, and
the first threshold value is lower than the second threshold value in a case where the touch sensor is not deflected toward the display device and the projected portion indicated by the difference values has the second width that is wider than the first width.

6. A touch sensor controller for use with a touch sensor of a capacitive type that is disposed over a display device and spaced apart from the display device by an air gap between the touch sensor and the display device, the touch sensor being deflectable toward the display device and including a plurality of sensor electrodes, the touch sensor controller comprising:
a touch detection circuit which, in operation, acquires a plurality of capacitance values at a plurality of crossing positions of the sensor electrodes, each of the capacitance values indicative of a capacitance between an indicator and the touch sensor at one of the crossing positions, acquires a plurality of difference values for the crossing positions, wherein the difference values for the crossing positions are the detection values at the crossing positions minus a plurality of reference values for the crossing positions, and each of the reference values corresponds to a different one of the crossing positions; and
a coordinate derivation circuit which, in operation,
acquires a maximum value among a plurality of difference values for the crossing positions,
determines a first threshold value by subtracting a subtraction value, which is a fixed value or a value that decreases as the maximum value increases, from the maximum value among the difference values for the crossing positions,
determines whether the first threshold value is greater than or equal to a second threshold value, and
in response to determining that the first threshold value is greater than or equal to the second threshold value, derives a position of the indicator based on the detection values for the crossing positions with reference to the first threshold value, wherein the position of the indicator is not derived based on the detection values at the crossing positions if the first threshold value is not determined to be greater than or equal to the second threshold value.

7. The touch sensor controller according to claim 6, wherein:

the first threshold value is higher than the second threshold value in a case where the touch sensor is not deflected toward the display device and a projected portion indicated by the difference values has a first width, the first threshold value is higher than the second threshold value in a case where the touch sensor is deflected toward the display device and the projected portion indicated by the difference values has a second width that is wider than the first width, and the first threshold value is lower than the second threshold value in a case where the touch sensor is not deflected toward the display device and the projected portion indicated by the difference values has the second width that is wider than the first width.

\* \* \* \* \*